US012326023B2

(12) United States Patent
Fink et al.

(10) Patent No.: US 12,326,023 B2
(45) Date of Patent: Jun. 10, 2025

(54) LOCKING DEVICE FOR RELEASABLY LOCKING TWO FURNITURE PARTS THAT CAN MOVE RELATIVE TO ONE ANOTHER

(71) Applicant: Julius Blum GmbH, Hoechst (AT)

(72) Inventors: Florian Fink, Hoerbranz (AT); Lukas Blum, Bregenz (AT)

(73) Assignee: JULIUS BLUM GMBH, Hoechst (AT)

( * ) Notice: Subject to any disclaimer, the term of this patent is extended or adjusted under 35 U.S.C. 154(b) by 245 days.

(21) Appl. No.: 17/840,974

(22) Filed: Jun. 15, 2022

(65) Prior Publication Data

US 2022/0372808 A1 Nov. 24, 2022

Related U.S. Application Data

(63) Continuation of application No. PCT/AT2020/060453, filed on Dec. 11, 2020.

(30) Foreign Application Priority Data

Dec. 19, 2019 (AT) .............................. A 51116/2019

(51) Int. Cl.
*E05D 15/26* (2006.01)
*E05B 63/22* (2006.01)
*E05C 19/02* (2006.01)

(52) U.S. Cl.
CPC .......... *E05D 15/264* (2013.01); *E05C 19/022* (2013.01); *E05B 63/22* (2013.01); *E05Y 2201/22* (2013.01)

(58) Field of Classification Search
CPC . E05C 19/02; E05C 9/02; E05B 63/22; E05B 65/44; E05D 15/264; E05D 15/26;
(Continued)

(56) References Cited

U.S. PATENT DOCUMENTS 4,657,292 A * 4/1987 Bruck ...................... E05B 77/06 292/DIG. 4
5,040,833 A * 8/1991 Brunnert .............. A47B 88/463 292/DIG. 4
(Continued)

FOREIGN PATENT DOCUMENTS

AT 508139 A4 * 11/2010 ......... A47B 88/0477
CN 1490489 A * 4/2004 ........... E05C 19/022
(Continued)

OTHER PUBLICATIONS

EP4134506 Espacenet machine translation description and claims (Year: 2024).*
(Continued)

*Primary Examiner* — Kristina R Fulton
*Assistant Examiner* — Steven A Tullia
(74) *Attorney, Agent, or Firm* — Wenderoth, Lind & Ponack, L.L.P.

(57) ABSTRACT

A locking device for releasably locking two furniture parts that can move relative to one another against the force of a force accumulator, includes a heart-shaped locking contour with a heart-shaped depression and a locking element, and can move relative to the heart-shaped locking contour and, in a locking position, can be arranged in the heart-shaped depression of the heart-shaped locking contour. The locking element can be moved, by a motion out of the locking position into a further pushed position, out of the heart-shaped depression into a release position, and the locking device has a push-through depression separate from the heart-shaped depression, in which the at least one locking element can be arranged and at least one blocking contour which blocks movement of the at least one locking element out of the push-through depression into the heart-shaped depression.

29 Claims, 15 Drawing Sheets

(58) Field of Classification Search

CPC ................. E05D 15/58; E05Y 2201/22; E05Y 2201/232; E05Y 2201/426; E05Y 2201/46; E05Y 2201/624; E05Y 2201/688; E05Y 2600/12; E05Y 2600/11; E05Y 2600/21; E05Y 2600/212; E05F 1/1066; E05F 1/1016; E05F 1/08; Y10T 292/1051

See application file for complete search history.

(56) References Cited

U.S. PATENT DOCUMENTS

| | | | | |
|---|---|---|---|---|
| 7,374,261 | B1 * | 5/2008 | Wang | A47B 88/463 312/319.1 |
| 8,807,671 | B2 | 8/2014 | Brunnmayr | |
| 9,810,253 | B2 | 11/2017 | Koelling et al. | |
| 10,197,081 | B2 | 2/2019 | Koelling et al. | |
| 10,316,565 | B2 | 6/2019 | Gabl | |
| D883,778 | S | 5/2020 | Koelling et al. | |
| D883,779 | S | 5/2020 | Koelling et al. | |
| D885,171 | S | 5/2020 | Koelling et al. | |
| 10,677,512 | B1 * | 6/2020 | Contin | E05B 65/0042 |
| 10,753,133 | B2 | 8/2020 | Kohlweiss | |
| D909,190 | S | 2/2021 | Koelling et al. | |
| D909,191 | S | 2/2021 | Koelling et al. | |
| D909,192 | S | 2/2021 | Koelling et al. | |
| 11,204,052 | B2 | 12/2021 | Koelling et al. | |
| 11,512,514 | B2 * | 11/2022 | Blum | E06B 3/5054 |
| 2007/0103041 | A1 * | 5/2007 | Kropf | A47B 88/463 312/319.1 |
| 2007/0120380 | A1 | 5/2007 | Bella | |
| 2014/0021841 | A1 | 1/2014 | Brunnmayr | |
| 2016/0273250 | A1 * | 9/2016 | Endo | E05B 65/52 |
| 2017/0023041 | A1 | 1/2017 | Koelling et al. | |
| 2017/0023043 | A1 | 1/2017 | Koelling et al. | |
| 2017/0247924 | A1 | 8/2017 | Gabl | |
| 2018/0051734 | A1 | 2/2018 | Koelling et al. | |
| 2018/0098627 | A1 | 4/2018 | Savage | |
| 2018/0119470 | A1 | 5/2018 | Kohlweiss | |
| 2018/0220798 | A1 | 8/2018 | Koelling et al. | |
| 2019/0285335 | A1 * | 9/2019 | Hunter | E05D 11/06 |
| 2022/0372808 | A1 * | 11/2022 | Fink | E05C 19/022 |

FOREIGN PATENT DOCUMENTS

| | | | | | |
|---|---|---|---|---|---|
| CN | 101166879 | A | * | 4/2008 | E05F 1/1066 |
| CN | 102597397 | A | * | 7/2012 | E05C 19/022 |
| CN | 103338678 | | | 10/2013 | |
| CN | 104481313 | A | * | 4/2015 | B60K 15/05 |
| CN | 107735542 | | | 2/2018 | |
| CN | 110318595 | A | * | 10/2019 | E05B 63/22 |
| CN | 110710807 | A | * | 1/2020 | A47B 88/463 |
| CN | 213205310 | U | * | 5/2021 | B60K 15/05 |
| DE | 10 2013 114 416 | | | 6/2015 | |
| DE | 20 2014 004 317 | | | 10/2015 | |
| DE | 202021101398 | U1 | * | 6/2021 | A47B 88/463 |
| EP | 1253271 | A2 | * | 10/2002 | E05B 77/06 |
| EP | 3138983 | A1 | * | 3/2017 | E05D 15/262 |
| EP | 4124714 | A1 | * | 2/2023 | E05D 15/264 |
| EP | 4134506 | A1 | * | 2/2023 | E05D 15/264 |
| FR | 2538053 | A1 | * | 12/1982 | F16B 21/00 |
| JP | 5-45183 | | | 6/1993 | |
| JP | 07269177 | A | * | 10/1995 | E05B 1/00 |
| JP | H11217048 | A1 | * | 8/1999 | E05C 19/02 |
| JP | 2011-162994 | | | 8/2011 | |
| JP | 2011162994 | A | * | 8/2011 | |
| JP | 5171546 | B2 | * | 3/2013 | E05C 19/02 |
| JP | 2018-500482 | | | 1/2018 | |
| KR | 101031856 | B1 | * | 5/2011 | A47B 88/00 |
| TW | 201712237 | | | 4/2017 | |
| WO | WO-2008105407 | A1 | * | 9/2008 | B60N 3/083 |
| WO | WO-2010087034 | A1 | * | 8/2010 | E05B 63/22 |
| WO | WO-2011143682 | A1 | * | 11/2011 | A47B 88/047 |
| WO | 2012/149587 | | | 11/2012 | |
| WO | 2016/081960 | | | 6/2016 | |
| WO | 2017/000006 | | | 1/2017 | |

OTHER PUBLICATIONS

International Search Report issued Mar. 11, 2021 in International (PCT) Application No. PCT/AT2020/060453.

* cited by examiner

LOCKING DEVICE FOR RELEASABLY LOCKING TWO FURNITURE PARTS THAT CAN MOVE RELATIVE TO ONE ANOTHER

BACKGROUND OF THE INVENTION

The invention relates to a locking device for releasably locking two furniture parts that can move relative to one another against the force of an energy storage mechanism, comprising a heart-shaped locking contour with a heart-shaped depression and at least one, in particular bolt-shaped, locking element that can move relative to the heart-shaped locking contour and, in a locking position, can be arranged in the heart-shaped depression of the heart-shaped locking contour. The at least one locking element can move, through a movement out of the locking position into an overpressed position, out of the heart-shaped depression into a release position. The invention furthermore relates to an ejection device for a movable furniture part, comprising at least two component parts that can move relative to one another and at least one energy storage mechanism, which is active between the at least two component parts. The invention furthermore relates to an ejection device for a movable furniture part, comprising at least two levers that can pivot relative to one another, at least one energy storage mechanism, which, in a loaded state, applies a force to the at least two levers in the direction of an open pivoting position, and at least one locking device for releasably locking the at least two levers in a closed position against the force of the loaded energy storage mechanism. The invention furthermore relates to a piece of furniture with a furniture carcass and at least one furniture part that can move relative to the furniture carcass.

Locking devices with heart-shaped locking contours and ejection devices with such locking devices are known from the state of the art. However, with such ejection devices, there is the problem that the locking device is always locked in a closed position of the ejection device. However, there are application cases in which an ejection device is required which does not automatically also generate a locking when the closed position is entered. For example, the ejection devices and locking devices from the state of the art are not suitable for performing a locking dependent on the relative position—of the ejection device, for example—in the closed position, since the locking device locks in every position of the closed position.

JP2011-162994 describes a door frame with a movable furniture part composed of two panels and an ejection device, wherein a lever of the ejection device is pushed against a guide bar of the door frame via a compression spring arranged centrally on a base, in order to spread the movable furniture part open out of a closed position into an open position. During a manual closing of the movable furniture part, the lever engages in the guide bar of the door frame again, the movable furniture part transitions into the closed position and force is applied to the compression spring. In the closed position, the ejection device is locked via a locking device. The locking device consists of a gripper, which generates a locking by engaging in a hook.

A disadvantage of the state of the art is that, due to the construction of the ejection device out of only one lever, which generates a spreading-open action of the movable furniture part about an axis of rotation via only one spring, a separately arranged guide bar is provided. The separately arranged guide bar cannot be arranged between the panels of the movable furniture part due to structural size, as a result of which only the transition between a closed position and an open position is made possible by the ejection device. Moreover, the locking mechanism locks the ejection device in the case of small opening angles of the panels of the movable furniture part, as a result of which there is no need to spread the movable furniture part open out of a folded-up position using the ejection device. This is due to the structural design of the locking device and the compression spring arranged centrally on the base, wherein the compression spring brings about a force transmission onto the lever normal to the base and does not make any small opening angles of the panels possible, in particular not without locking the ejection device in the case of small angles between the lever and the base in the case of an identical mode of operation. In addition, the force of the ejection device is conveyed jerkily by the compression spring, which is accompanied by less convenience in using the piece of furniture and a reduction in the life of the components involved in the spreading-open action.

SUMMARY OF THE INVENTION

The objective technical problem of the present invention is therefore to specify a locking device that is improved compared with the state of the art, an ejection device with a locking device and a piece of furniture with such an ejection device, in which the disadvantages of the state of the art are at least partially remedied, and which are characterized in particular in that a locking is selectively dependent on the extent to which the locking device closes.

Therefore, according to the invention, the locking device has a push-through depression that is separate from the heart-shaped depression and in which the at least one locking element can be arranged, and at least one blocking contour, which blocks a movement of the at least one locking element out of the push-through depression into the heart-shaped depression.

The at least one heart-shaped depression guarantees a locking state, wherein the at least one blocking contour guides the at least one locking element into the push-through depression when the locking device is overpressed out of the locking state. If the at least one locking element is located in the push-through depression, then during a transition into a less overpressed position of the locking device the at least one locking element is guided past the heart-shaped depression over the at least one blocking contour and transferred into a release position.

If the locking device is in the release position, then in the case of a constant exertion of pressure on the locking device the at least one locking element is guided past the heart-shaped depression and into the push-through depression, wherein the transition into a release position again is made possible once the exertion of pressure has ended.

If the exertion of pressure on the locking device is ended substantially immediately after the at least one locking element has been elevated above the heart-shaped depression, the at least one locking element is arranged in the heart-shaped depression and the locking state is established.

Only then is it thereby made possible for the locking device to be able to transfer out of the release position into the locking state and out of the locking state into the release position as well as out of the release position and into the release position again without a subsequent locking, dependent on a progression of the exertion of pressure.

The locking device thus makes a selective locking possible, dependent on several possible relative positions of the locking element in relation to the heart-shaped locking contour.

Furthermore, the ejection device has at least one such locking device, wherein the heart-shaped locking contour is arranged on one of the at least two component parts that can move relative to one another and the at least one locking element is arranged on the other.

It is thereby made possible that in the case of an exertion of pressure on the ejection device, the at least one locking element can come to rest in the heart-shaped locking contour and the ejection device can transfer into a positionally stable closed position.

Moreover, the at least one locking device can be formed such that the at least two levers, unlocked, can move freely relative to one another in a pushed-through position in which the levers form an angle which is smaller than the angle of the levers in the closed position.

The fact that the at least two levers can move freely relative to one another in the pushed-through position makes it possible for the at least one locking element of the locking device to be able to be guided past the heart-shaped locking contour over the at least one blocking contour, and thus the transition of the ejection device into the open pivoting position is guaranteed.

Independently of whether the ejection device is previously in the closed position or in an open pivoting position, the transition of the ejection device into a pushed-through position is guaranteed in the case of an exertion of pressure beyond the closed position, and the transition into the open pivoting position is guaranteed when the exertion of pressure is ended.

The force of the at least one energy storage mechanism is active both in the closed position for the effective locking and in the pushed-through position for supporting the movement into the open pivoting position.

Moreover, the piece of furniture can have at least one such ejection device.

It is thereby made possible for the at least one ejection device to support a transfer of the at least two panels of the movable furniture part out of the coplanar position into an open position and the at least two panels out of the parallel position into a spread-open position.

In the parallel position, the at least one ejection device is in the pushed-through position, wherein the locking devices arranged thereon are in the overpressed position. As a result, in the case of a movement out of the parallel position, the force of the energy storage mechanism can act and makes it possible for the at least two panels to unfold.

In the coplanar position, the at least one ejection device is in the closed position, wherein the locking devices arranged thereon are in the locking position. As a result, the force of the energy storage mechanism is impeded and the at least two panels remain stationary in the coplanar position. When the at least one ejection device transitions into the pushed-through position, the locking device is in the overpressed position, wherein the force of the energy storage mechanism acts and makes an opening of the at least two panels possible.

The at least one ejection device thus guarantees both an opening of the movable furniture part out of a coplanar position and a spreading open out of a parallel position.

According to an advantageous design of the invention, the at least one blocking contour has at least one blocking chamfer with which the at least one locking element can be forced in the direction of the release position, starting from an arrangement in the push-through depression.

The blocking chamfer makes it possible, after the at least one locking element has been arranged in the push-through depression, for the at least one locking element to be guided past the heart-shaped locking element and the locking device to transition not into the locking position but into the release position.

In one embodiment of the invention, the locking device has at least one bypass channel, through which the at least one locking element can move past the heart-shaped depression into the push-through depression.

The transition of the at least one locking element out of the release position past the heart-shaped locking contour and the at least one blocking contour into the push-through depression is particularly promoted by the at least one bypass channel.

Advantageously, the locking device has at least one inlet opening for the at least one locking element, and the heart-shaped locking contour and the at least one blocking contour are arranged between the at least one inlet opening and the push-through depression.

From the release position, the at least one locking element can reach the heart-shaped locking contour and/or the push-through depression via the at least one inlet opening.

Because the at least one blocking contour and the heart-shaped locking contour are arranged between the push-through depression and the at least one inlet opening, it is possible to establish either the locking position and then the release position again or the release position again without an interim locking, depending on a degree of the overpushing out of the release position. In both variants, the at least one locking element enters the push-through depression before the release.

It has proved to be convenient for at least the heart-shaped locking contour, the push-through depression and the at least one blocking contour to be arranged on a common base.

As a result, the maintenance effort is reduced and the life is extended since there are fewer separate component parts of the locking device.

It has proved to be advantageous for the at least one locking element to be arranged on a pivotable lever, preferably of at least two levers that can pivot relative to one another.

As a result, the at least one locking element can enter the at least one inlet opening of the locking device in the case of a movement of the pivotable lever relative to a second component part or lever.

An advantageous variant is that the at least one locking device is formed such that the heart-shaped locking contour is arranged on one of the at least two levers that can pivot relative to one another, and the at least one locking element is arranged on the other.

A movement progression of the at least one locking element between the at least one inlet opening and the push-through depression is thereby effected in a particularly convenient manner.

It is particularly preferred for one of the at least two levers to have fastening means (a fastening element) for fastening the ejection device on the movable furniture part, and/or one of the at least two levers to have a free end, on which at least one rotatably mounted rolling body for supporting the lever on a stop surface has, and/or one of the at least two levers has a free end on which at least one spacer is arranged, preferably wherein the at least one spacer can be arranged in different positions relative to the free end.

The fastening means guarantee that the ejection device can be fixed on the movable furniture part in a positionally stable manner after installation.

The friction during a contact between the ejection device and the stop surface is reduced by the rolling bodies arranged on the free end, as a result of which the life of both the ejection device and the stop surface is increased. The stop surface can be arranged on a separate component of a piece of furniture or be an integral constituent of the piece of furniture. Particularly preferably, the stop surface is formed by the furniture carcass during the transition between the coplanar position and the open position and by one of the at least two panels during the transition between the parallel position and the spread-open position.

It is possible to react to the structural design of the piece of furniture through the at least one spacer arranged on the free end because the distance between the ejection device and the stop surface can be adjusted.

Depending on the setting of the spacer, the locking device of the ejection device is transferred into the overpressed position earlier or respectively later, in the case of an exertion of pressure by a user. In addition, a fine adjustment can be effected via the spacer, in order to guarantee the locking position in the case of a predefined angle between the at least two levers.

It has proved to be convenient for the ejection device to have a first part of a guard locking device which can be brought into operative connection with a second part of the guard locking device which can be arranged on a piece of furniture, preferably wherein one of the two parts of the guard locking device has a permanent magnet and the other of the two parts is formed metallic at least in regions, and/or the first part of the guard locking device is arranged on an exterior of the ejection device.

It is possible to react to the structural size of the piece of furniture and/or the structural circumstances before installation through the guard locking device formed in two parts.

The guard locking device supports the at least one energy storage mechanism to the effect that, in the locking position, the at least one locking element is pressed into the heart-shaped depression of the heart-shaped locking contour, in order to prevent an undesired release of the locking in the coplanar position.

Furthermore, preferably at least one spreading element is arranged between the at least two levers and at least one further energy storage mechanism is provided, wherein force can be applied to the at least two levers by the at least one further energy storage mechanism via the at least one spreading element.

This results in the advantageous effect that the application of force to the at least two levers via the at least one spreading element by the at least one further energy storage mechanism is conveyed in addition to the at least one energy storage mechanism.

Furthermore, more convenience in the operation of the ejection device and/or of the piece of furniture is thereby provided, since less force needs to be applied by the user and also heavier and/or larger moving furniture parts can be opened or respectively spread open by the ejection device in a low-force manner.

Moreover, a harmonic force progression of the at least one ejection device during the movement of the movable furniture part is effected, since the action of the at least one further energy storage mechanism is conveyed via the at least one spreading element. This protects the components of the piece of furniture from damage and achieves a user-friendly handling of the ejection device or the piece of furniture, respectively.

It is particularly preferred that the at least one further energy storage mechanism is arranged substantially parallel to one of the at least two levers.

This makes it possible for substantially no force to act on the at least one spreading element in the closed position of the ejection device, since, in the locking state, a dead center position is substantially established between the at least one further energy storage mechanism and one of the at least two levers.

Moreover, a particularly favorable transfer of force of the at least one further energy storage mechanism to the at least two levers is effected, which causes both a smooth and harmonic opening, or respectively spreading-open, action and a smooth and harmonic loading action of the at least one further energy storage mechanism.

It has proved to be advantageous for the at least one energy storage mechanism and/or the at least one further energy storage mechanism to be formed in the form of at least one spring.

Since springs are convenient to produce and acquire, a low-cost ejection device can thereby be made possible.

According to an advantageous design of the invention, the at least one further energy storage mechanism is arranged between an energy storage mechanism bracket arranged stationary and an energy storage mechanism bracket that can move relative thereto and/or the at least one further energy storage mechanism is arranged on at least one cross member connected to the at least one spreading element, preferably wherein the at least one cross member comprises at least one rolling element for movement along one of the at least two levers.

The energy storage mechanism bracket arranged stationary makes a transfer of force via one of the at least two levers to the movable furniture part and consequently to the piece of furniture possible. The movable energy storage mechanism bracket makes a transfer of force via the at least one spreading element to the at least two levers possible.

The arrangement of the movable energy storage mechanism bracket on the at least one cross member makes a more flexible fitting of the at least one further energy storage mechanism possible and, in addition, several further energy storage mechanisms can be received through an extension of the at least one cross member.

Rolling elements prove to be particularly convenient due to a movement of the at least one cross member during the spreading open or loading of the ejection device, since the friction against one of the at least two levers is reduced and guiding is effected at a distance from one of the at least two levers of a radius of the rolling elements.

According to an advantageous embodiment of the invention, the at least one spreading element is connected to the at least one cross member and/or one of the at least two levers in an articulated manner.

This makes it possible to transfer the movement of the at least one cross member, initiated by the at least one further energy storage mechanism, to the at least two levers by a rotational movement of the at least one spreading element.

An advantageous variant is that the at least one energy storage mechanism and/or the at least one further energy storage mechanism can be loaded by a movement of at least one of the at least two levers.

This makes it possible for the energy which is stored in the energy storage mechanisms in the case of the movement of at least one of the at least two levers subsequently to be available for the movement of the movable furniture part and to support the user in moving the movable furniture part.

It is particularly preferred that the at least one movable furniture part has at least two panels connected to one another in an articulated manner, which can move between a coplanar position, in which the at least two panels are arranged substantially in the same plane, and a parallel position, in which the at least two panels are arranged substantially parallel to one another, the at least one ejection device is arranged on one of the at least two panels, and the at least two levers are arranged in the locked closed position when the at least two panels are located in the coplanar position, and are arranged in the unlocked pushed-through position when the at least two panels are located in the parallel position.

An unintended opening of the movable furniture part is prevented by the ejection device being in the locked closed position with the at least two panels in the coplanar position.

An automatic spreading open of the movable furniture part is made possible by the ejection device being in the unlocked pushed-through position with the at least two panels in the parallel position, unless this spreading open is prevented by a lateral receiving shaft or a provided carriage (desired).

According to a preferred embodiment of the invention, at least one receiving shaft, preferably arranged laterally on the furniture carcass, is provided for receiving the at least one movable furniture part arranged in the parallel position of the at least two panels.

Through a lowering of the movable furniture part in a lateral receiving shaft, the furniture carcass is freely accessible. In addition, without a movable furniture part arranged in front of the piece of furniture and located in the parallel position, the result is an esthetically appealing piece of furniture.

It has proved to be advantageous for the at least one ejection device to be able to be transferred out of the locked closed position into the open pivoting position through the exertion of pressure on the at least two panels. Preferably, the exertion of pressure can be performed in a region in which the at least two panels are connected to one another in an articulated manner.

This makes it possible for the user of the piece of furniture to release the at least one ejection device located in the closed position in a user-friendly manner. Here, the at least one locking element is carried out of the heart-shaped curve into the overpush depression and the locking device can transition into the release position.

It has proved to be convenient to provide at least one carriage, which can preferably travel along at least one horizontally arranged rail, and which can be coupled to one of the at least two panels, preferably by means of at least one hinge, wherein it is preferably provided that the at least one carriage can be lowered into the at least one receiving shaft together with the movable furniture part, and/or during a movement along the at least one rail the carriage is supported on a guide via at least one guide roller and/or a movement of the at least one spreading element can be blocked by means of the at least one carriage.

The movement of the at least two panels is guided by the at least one carriage, as a result of which a stable movement of the movable furniture part along the furniture carcass is guaranteed. In addition, a veering off course of one of the at least two panels is thereby prevented.

The movement of the at least one carriage along the at least one rail is made easier by the at least one guide roller since the friction between the at least one carriage and the at least one rail is reduced.

According to an advantageous embodiment of the invention, at least one ejection device is provided for ejecting the at least two panels from the at least one receiving shaft.

The at least one ejection device makes it easier for the user of the piece of furniture to carry the movable furniture part out of a lowered position in the receiving shaft, wherein the at least one ejection device effects a spreading open of the at least two panels outside the at least one receiving shaft.

BRIEF DESCRIPTION OF THE DRAWINGS

Further details and advantages of the present invention are explained in more detail below with reference to the embodiments represented in the drawings, in which.

DETAILED DESCRIPTION OF THE INVENTION

Figure 1A:
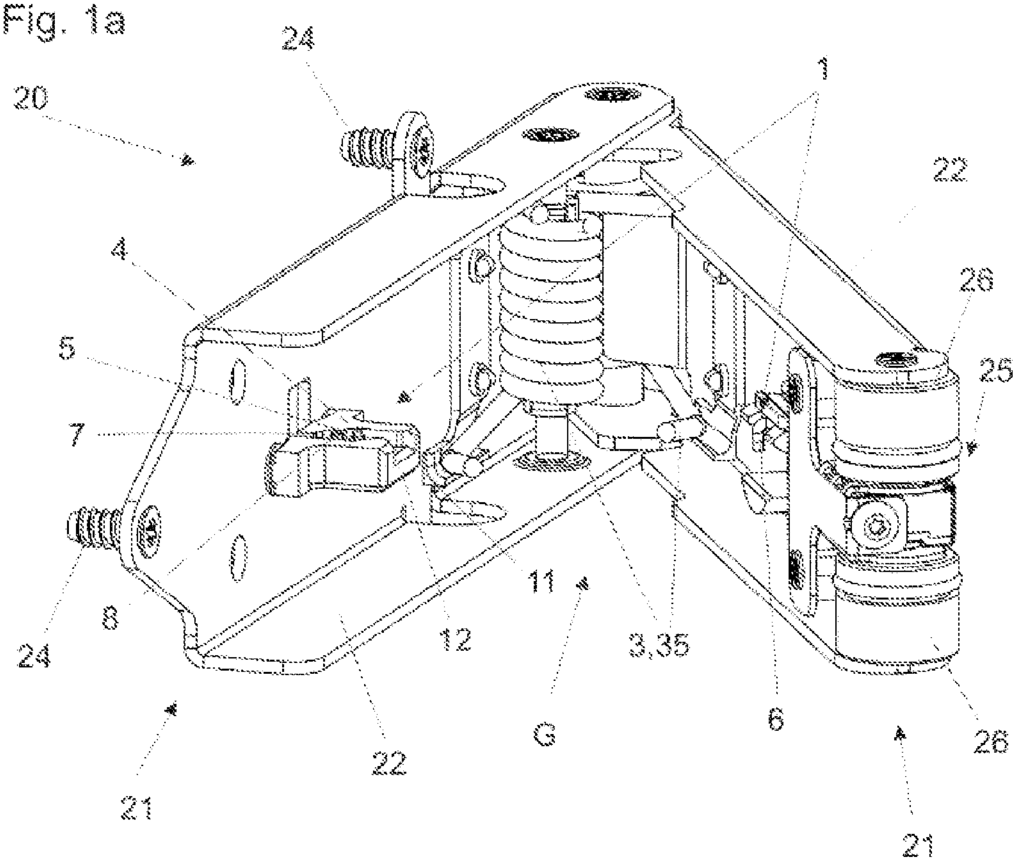
FIGS. 1*a*-1*b* show an ejection device according to a first preferred embodiment in an open state in a perspective view and a view from the side.

FIG. 1*a* shows an ejection device 20 for a movable furniture part 2 (not visible for the sake of clarity), comprising two (first and second) component parts 21 that can move relative to one another, and two energy storage mechanisms 3 in the form of a spring 35 (leg spring). The two energy storage mechanisms 3 are active between the two component parts 21, wherein the two component parts 21 are in the form of two levers 22.

The ejection device 20 has a locking device 1, wherein a heart-shaped locking contour 4 is arranged on one of the two component parts 21 that can move relative to one another and a locking element 6 is arranged on the other.

Figure 1B:
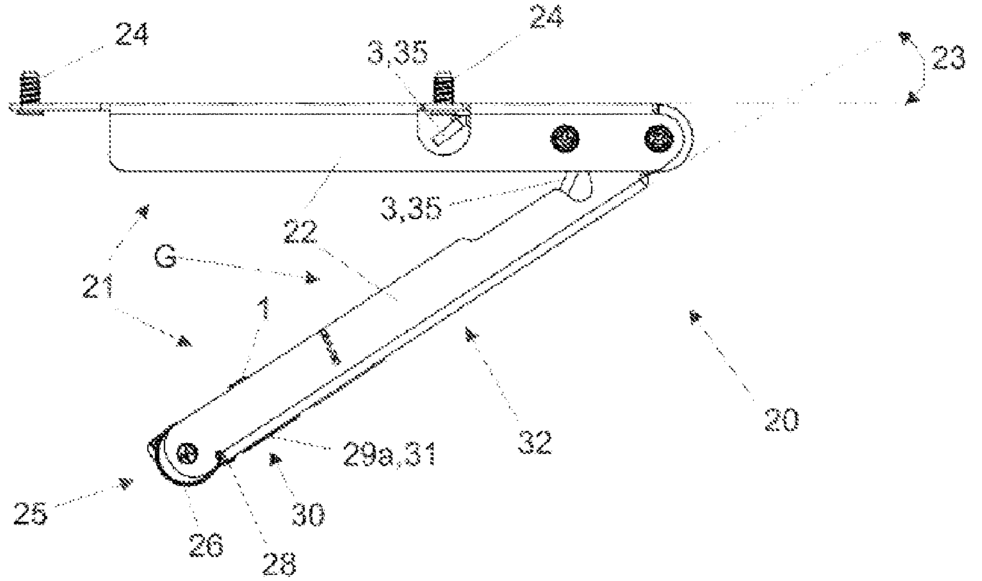

FIG. 1*b* shows the ejection device 20 with two levers 22 that can pivot relative to one another and two energy storage mechanisms 3, which, in a loaded state, apply a force to the two levers 22 in the direction of an open pivoting position G, and a locking device 1 for releasably locking the two levers 22 in a closed position S against the force of the loaded energy storage mechanisms 3.

The locking device 1 is formed such that the two levers 22, unlocked, can move freely relative to one another in a pushed-through position D, in which the levers 22 form an angle 23 which is smaller than the angle 23 of the levers 22 in the closed position S.

Figure 2A:
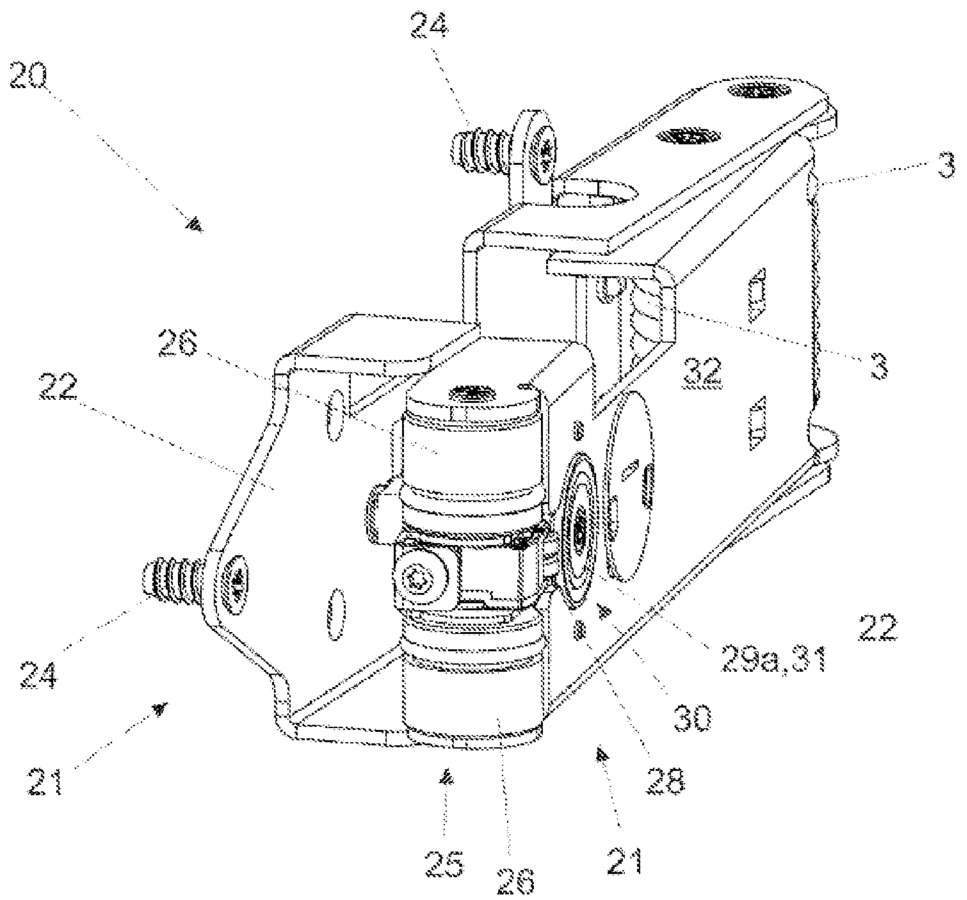
FIGS. 2*a*-2*b* show the ejection device according to the embodiment shown in FIG. 1*a* in an unlocked state with a cutout indicated in the representation for revealing a locking device according to a preferred embodiment in a perspective view and a view from the side.
Figure 2B:
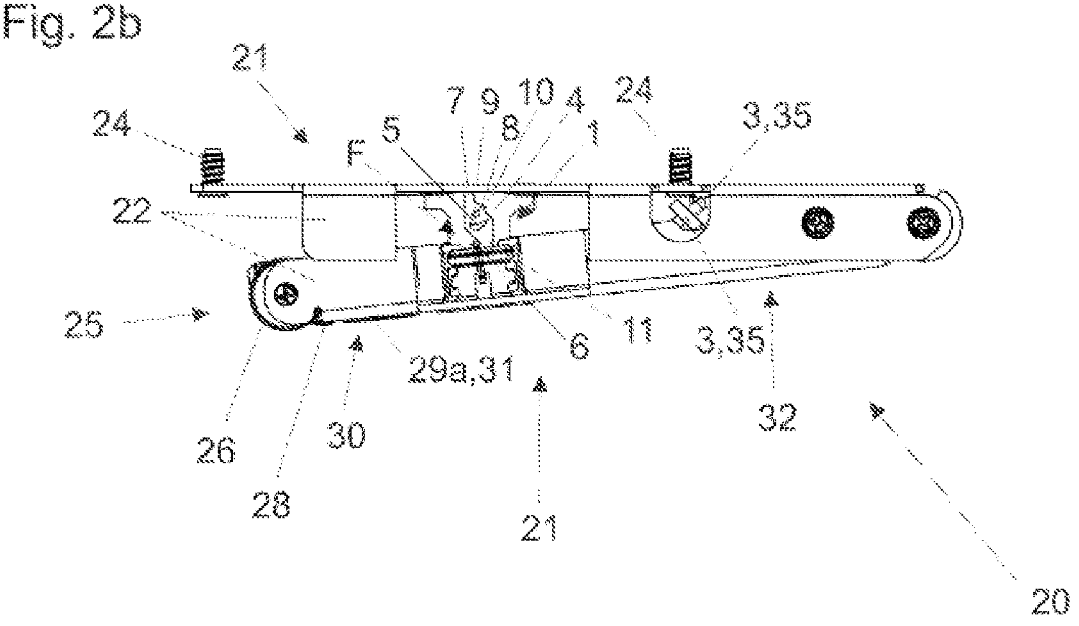

FIG. 2*a* and FIG. 2*b*, respectively, differ from FIG. 1*a* and FIG. 1*b*, respectively, in that the two levers 22 are pivoted out of the open pivoting position G in the direction of the closed position S. In the representation, there is a cutout in the two levers 22, in order to make the locking device 1, which is in the release position F, visible.

Figure 3A:
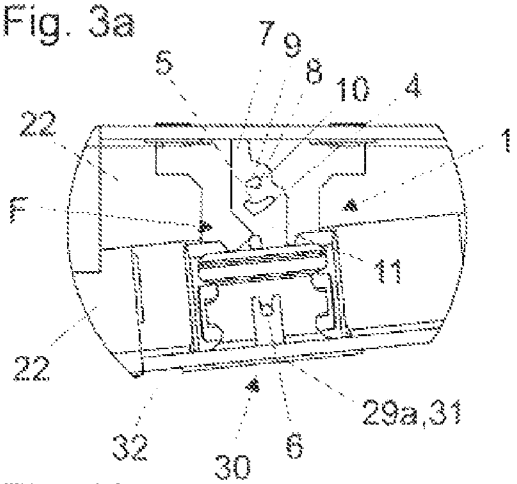
FIGS. 3*a*-3*h* show the locking device according to a first preferred embodiment in various chronologically represented positions from a release position into a locking position as well as from the locking position via an overpressed position into a release position in views from the side of the ejection device according to the embodiment shown in FIG. 2*a*.

FIG. 3*a* shows the locking device 1 for releasably locking two furniture parts 2 that can move relative to one another against the force of an energy storage mechanism 3 (not visible in the detailed section) in an enlarged view.

The locking device 1 comprises the heart-shaped locking contour 4 with a heart-shaped depression 5 and the locking element 6 that can move relative to the heart-shaped locking contour 4.

The locking element 6 can be arranged on one of the two levers 22 via a guide, wherein the locking element 6 can travel in the direction of a longitudinal extent (i.e., along the longitudinal axis) of the lever 22, for example. The locking element 6 can also be pivotably mounted, as can be seen in FIG. 2*a*, in order in this way to be able to follow the contours of the locking device 1.

The locking device 1 is in the release position F as the locking element 6 is not arranged in the heart-shaped depression 5 and is also not arranged beyond it (upwards in this view) in a bypass channel 10 or a push-through depression 7, for example. In this position, the locking element 6 enters an inlet opening 11 of the locking device 1.

Figure 3E:
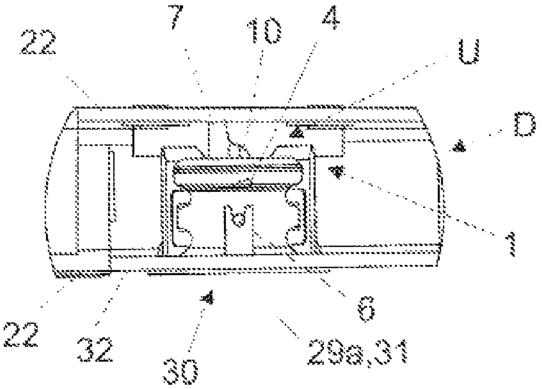
Figure 3B:
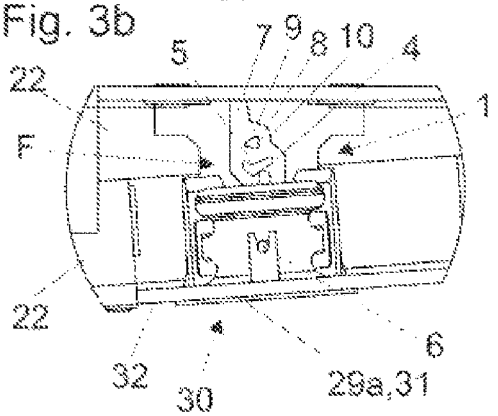

As clearly shown in at least FIGS. 2*b*, 3*a*, and 3*b*, the heart-shaped locking contour 4 and a blocking contour 8 are arranged between the inlet opening 11 and the push-through depression 7 and are spaced apart from each other.

The locking element 6 is arranged on one of two levers 22 that can pivot relative to one another. The heart-shaped locking contour 4 is arranged on one of the two levers 22 that can pivot relative to one another, and the locking element 6 is arranged on the other of the two levers 22.

FIG. 3*b* shows the locking device 1 still in the release position F, wherein the two levers 22 are pivoted relative to one another further than in FIG. 3*a*.

Figure 3F:
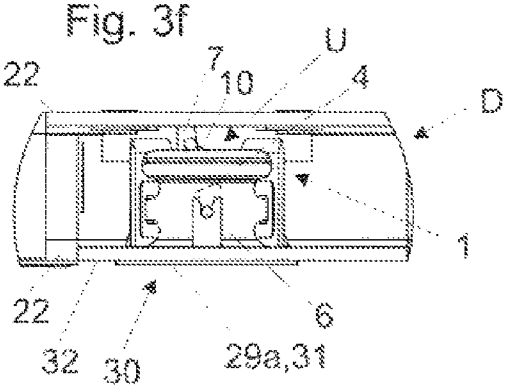
Figure 3C:
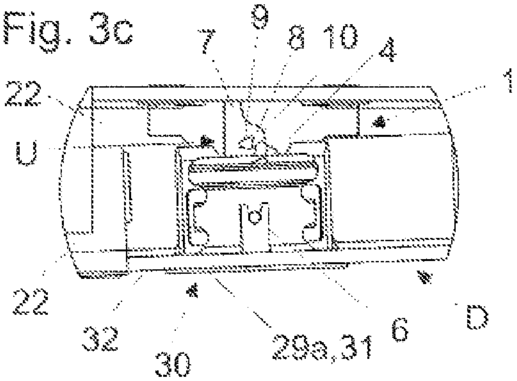

FIG. 3*c* shows the locking device 1 in an overpressed position U, wherein the two levers 22 are arranged in a pushed-through position D. Here, the locking element 6 is arranged above the heart-shaped depression 5, since within the meaning of the invention the end of the locking element 6 that has entered the inlet opening 11 of the locking device 1 is considered.

Figure 3G:
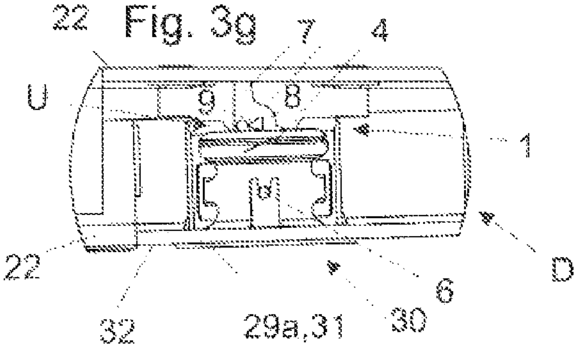
Figure 3D:
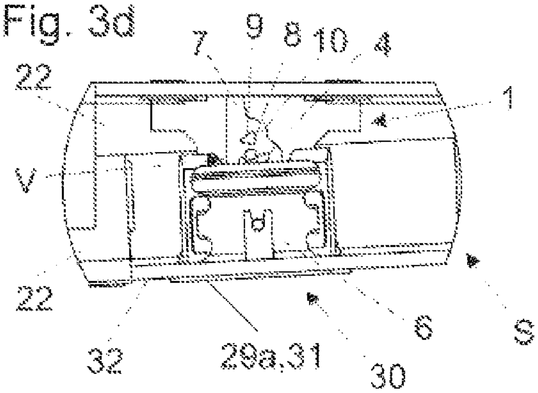

FIG. 3*d* shows the locking device 1 in a locking position V, in which the locking element 6 is arranged in the heart-shaped depression 5 of the heart-shaped locking contour 4.

FIG. 3*e* shows the locking device 1 in the overpressed position U, wherein the locking element 6 is arranged in the bypass channel 10. The levers 22 are in the pushed-through position D.

FIG. 3*f* shows the locking device 1 in the overpressed position U, wherein the locking element 6 is arranged in the push-through depression 7. In this position, the levers 22 are fully pivoted relative to one another and substantially lie in a parallel position relative to one another.

FIG. 3*g* shows the locking device 1 on the path between the overpressed position U and the release position F, wherein, out of the push-through depression 7, the locking element 6 strikes a blocking chamfer 9 of the blocking contour 8 and the locking element 6 is forced to the left, in this view, of the bypass channel 10.

After the locking element 6 has passed the blocking chamfer 9, the locking element 6 can exit, past the heart-shaped locking contour 4, via the inlet opening 11. In general, this can be generated automatically once the contact with the blocking contour 8 has ended or via a pre-loading of the locking element 6 (in a direction towards the left in this view).

Figure 3H:
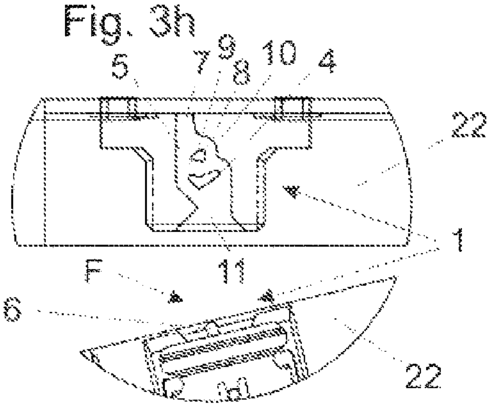

FIG. 3*h* shows the locking device 1 in the position in which the locking device 1 is passed into the release position F again. The described cycle can be carried out again. The locking element 6 can also be pushed directly into the push-through depression 7 without stopping in the heart-shaped depression 5, in order to transition into the release position F again without establishing the locking state V.

In a locking position V, the locking element 6 is arranged in the heart-shaped depression 5 of the heart-shaped locking contour 4. Through a movement out of the locking position V into an overpressed position U, the locking element 6 can move out of the heart-shaped depression 5 into a release position F.

The locking device 1 has the push-through depression 7, which is separate from the heart-shaped depression 5 and in which the locking element 6 can move in the overpressed position U. The locking device 1 has the blocking contour 8, which blocks a movement of the locking element 6 out of the push-through depression 7 into the heart-shaped depression 5.

The blocking contour 8 has the blocking chamfer 9, with which the locking element 6 is forced in the direction of the release position F, starting from an arrangement in the push-through depression 7.

The locking element 6 is moved past the heart-shaped depression 5 into the push-through depression 7 through the bypass channel 10.

Figure 4:
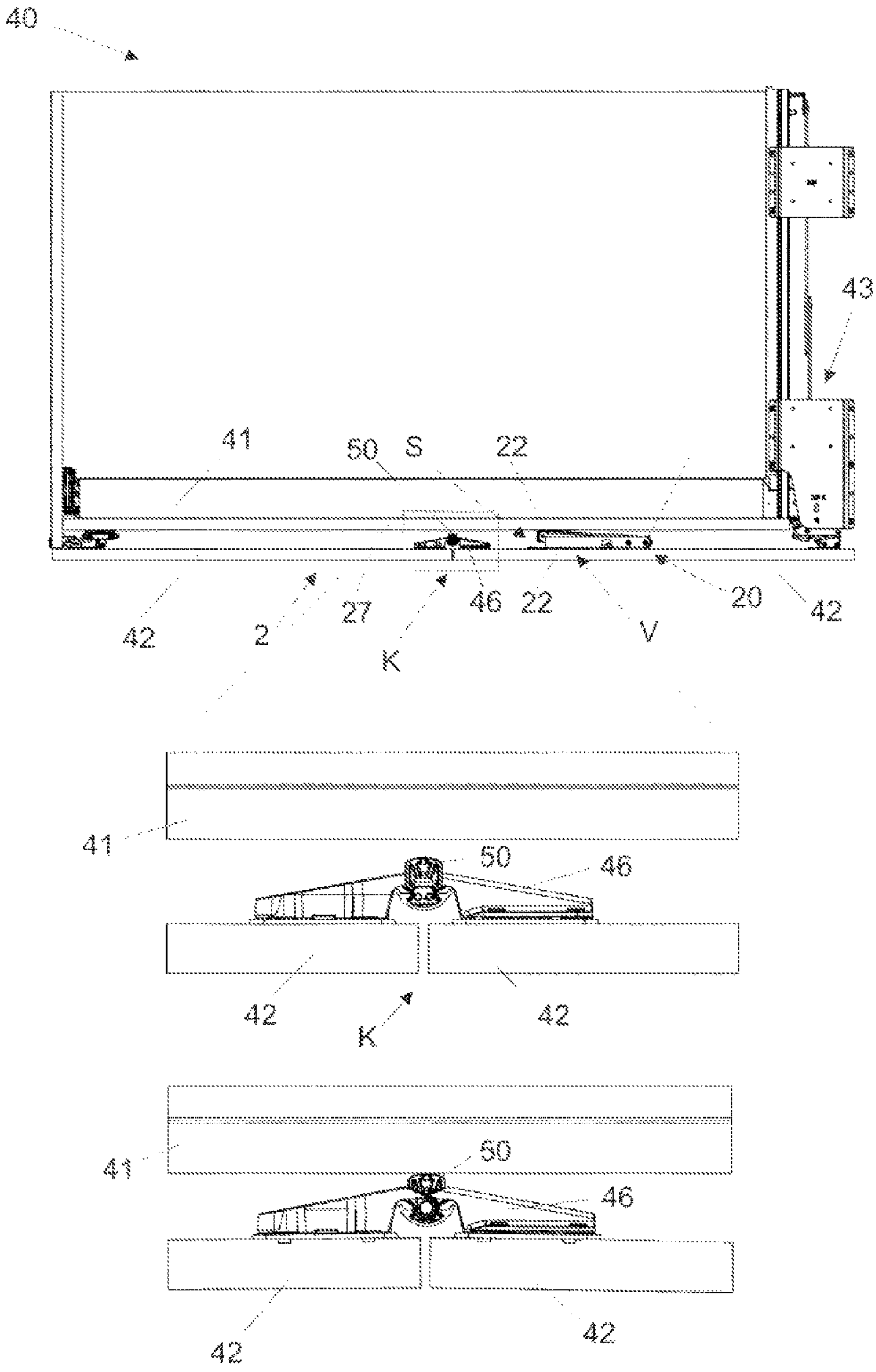
FIG. 4 shows a piece of furniture according to a preferred embodiment with a lateral receiving shaft, an ejection device according to the embodiment shown in FIG. 1*a* and two panels in a coplanar position in a view from above with two detailed views of a limiting element in the coplanar position and an overpressed position.

FIG. 4 shows a piece of furniture 40 with a furniture carcass 41 and a furniture part 2 that can move relative to the furniture carcass 41, wherein the piece of furniture 40 has an ejection device 20.

The movable furniture part 2 has two panels 42 connected to one another in an articulated manner, which can move between a coplanar position K, in which the at least two panels 42 are arranged in the same plane, and a parallel position P (in the case of an arrangement of the two panels 42 in a receiving shaft 43), in which the at least two panels 42 are arranged parallel to one another.

The ejection device 20 is arranged on one of the two panels 42. The two levers 22 are arranged in the locked closed position S, as the two panels 42 are located in the coplanar position K.

The ejection device 20 can be transferred out of the locked closed position S into the open pivoting position G by exertion of pressure on the two panels 42, wherein the exertion of pressure can be performed in a region in which the two panels 42 are connected to one another in an articulated manner. Once the exertion of pressure has ended, the two panels 42 transition into the open position.

A first detailed view shows a hinge 46 in an enlarged view, wherein the two panels 42 are arranged in the coplanar position K. A limiting element 50, which protrudes in the direction of the furniture carcass 41 in an installed state, is arranged centrally on a joint axle. An angular movement of the two panels 42 in the direction of a depth of the furniture carcass 41 can be limited by the limiting element 50 when they are located in the coplanar position K relative to one another.

In the coplanar position K of the two panels 42, the limiting element 50 is spaced apart from the furniture carcass 41 slightly, for example approximately 3 mm.

On the one hand, the limiting element 50 prevents the two panels 42 from being overpressed too strongly and on the other hand it provides a defined activation path for the ejection device 20.

A second detailed view shows the hinge 46 in an enlarged view, wherein the two panels 42 are moved in an overpressed position out of a coplanar position K in the direction of the furniture carcass 41.

If, starting from the coplanar position K relative to one other, the two panels 42 are now pushed in towards the depth of the furniture carcass 41 in the region of the axis connecting the two panels 42 to one another, then the limiting element 50 strikes against the furniture carcass 50 and thus prevents a further angular movement of the two panels 42 in the direction of the depth of the furniture carcass 41.

In this way, a variably settable, defined activation path for the ejection device 20 can also be provided with a touch latch function. In this case, starting from the coplanar position K, the two panels 42 can be ejected by the ejection device 20 over a length in the direction of the parallel position P.

Figure 5A:
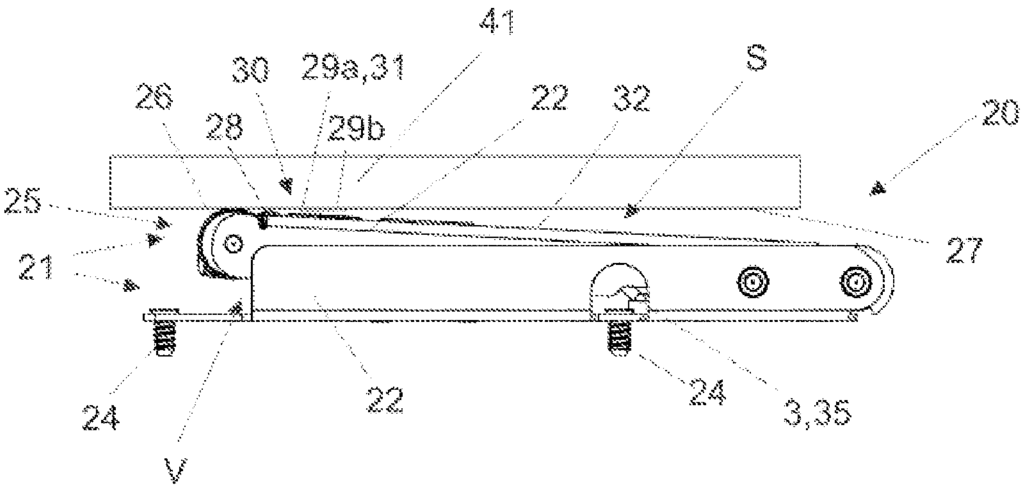
FIGS. 5*a*-5*b* show the ejection device according to the embodiment shown in FIG. 1*a* in contact with a furniture carcass in two different positions of a spacer.

FIG. 5*a* shows the ejection device 20, wherein one of the two levers 22 has a fastener 24 for fastening the ejection device 20 on the movable furniture part 2.

The second lever 22 has a free end 25, on which two rotatably mounted rolling bodies 26 are arranged for supporting the lever 22 against a stop surface 27 (the second rolling body 26 is concealed by the first rolling body 26 due to the side view). A spacer 28 is arranged on this lever 22, wherein the one spacer 28 can be arranged in different positions relative to the free end 25.

Figure 5B:
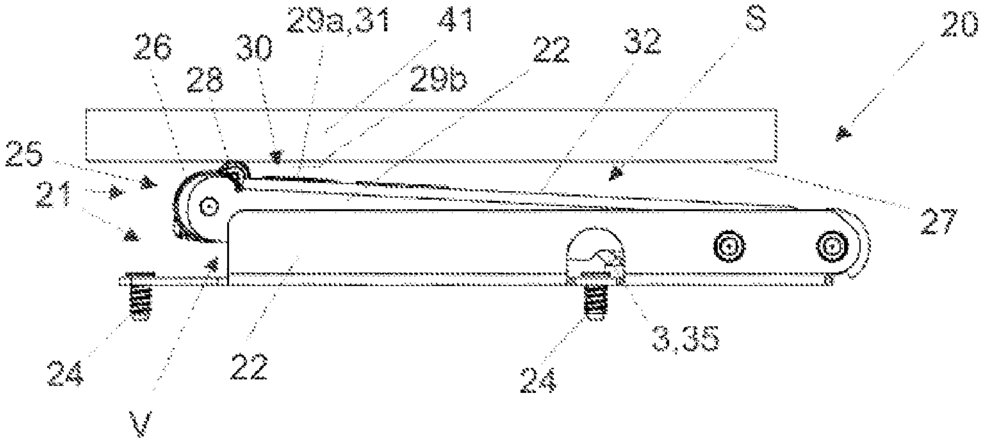

FIG. 5*b* shows the ejection device 20 has a first part 29*a* of a guard locking device 30 in operative connection with a second part 29*b* of the guard locking device 30 arranged on the furniture carcass 41. The part 29*a* of the guard locking device 30 has a permanent magnet 31 and the other part 29*b* is at least partially metallic. The first part 29*a* of the guard locking device 30 is arranged on an exterior 32 of the ejection device 20.

Figure 6A:
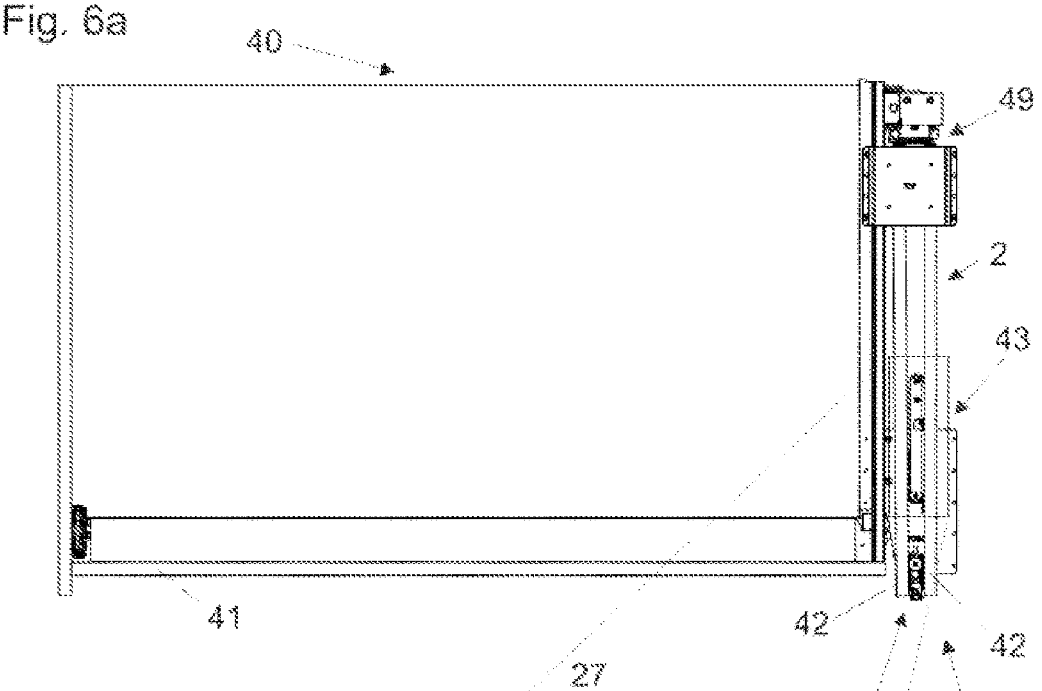
FIGS. 6*a*-6*b* show the piece of furniture according to the embodiment shown in FIG. 4 with the two panels in a parallel position in a laterally arranged receiving shaft.

FIG. 6*a* shows the piece of furniture 40, wherein the ejection device 20 is in the unlocked pushed-through position D as the two panels 42 are located in the parallel position P.

The receiving shaft 43 arranged laterally on the furniture carcass 41 is provided for receiving the furniture part 2 that can move in the parallel position P.

If the two panels 42 are pulled out of the receiving shaft 43, then the ejection device 20, with the locking device 1 in the overpressed position U, ends the parallel position P and the two panels 43 transition into the spread-open position.

An ejection mechanism 49 is provided for ejecting the two panels 42 from the receiving shaft 43.

Figure 6B:
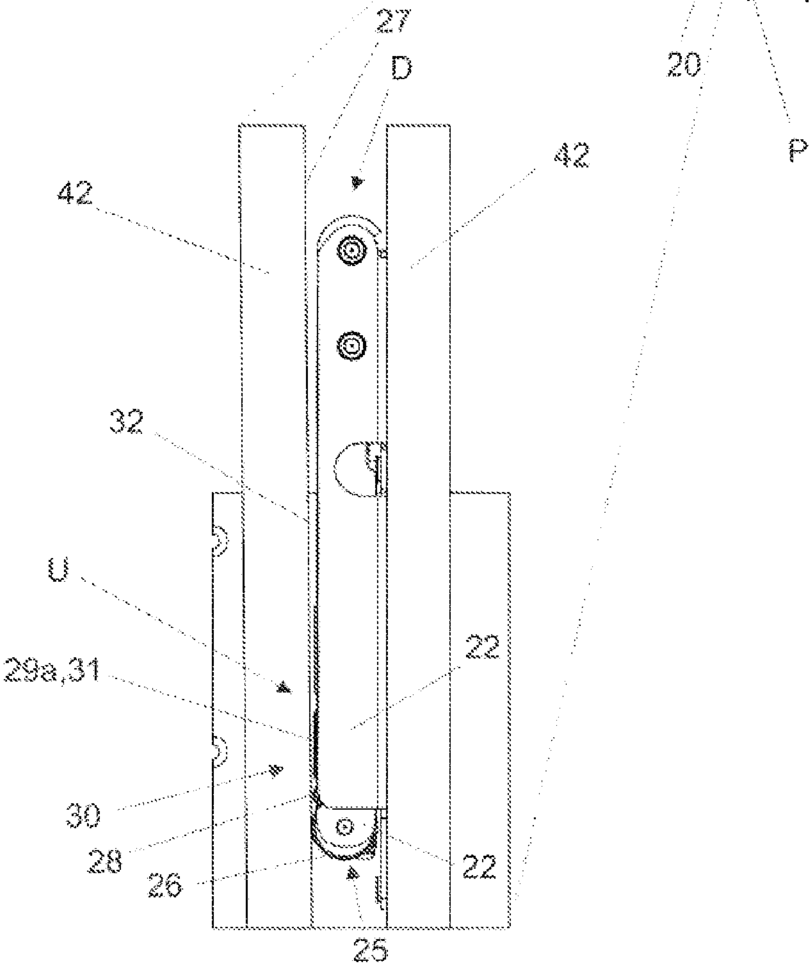

FIG. 6*b* shows an enlarged section from FIG. 6*a*, wherein the ejection device 20 is in the pushed-through position D and the locking device 1 arranged on the ejection device 20 is in the overpressed position U.

Figure 7:
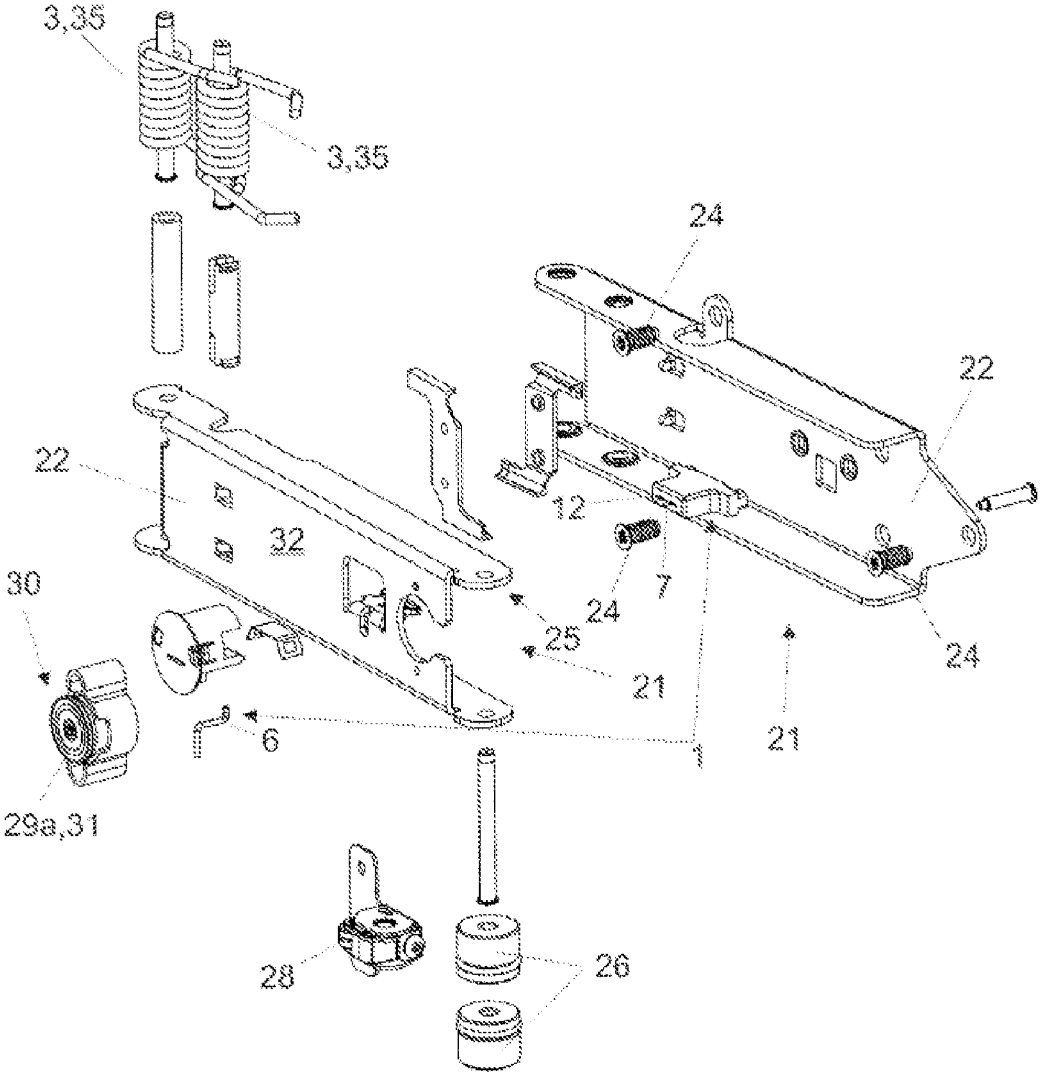
FIG. 7 is an exploded representation of the ejection device, showing its individual components, according to the embodiment shown in FIG. 1 a in a perspective view.

FIG. 7 shows the individual components of the ejection device 20. The locking element 6 is present as a bent pin, but a bolt-shaped locking element 6 is likewise possible.

The energy storage mechanisms 3 in the form of springs 35 are arranged on axles, wherein the axis of symmetry of one of the two axles defines the axis of rotation of the levers 22 of the ejection device 20.

The heart-shaped locking contour 4, the push-through depression 7 and the blocking contour 8 are arranged on a common base 12.

Figure 8A:
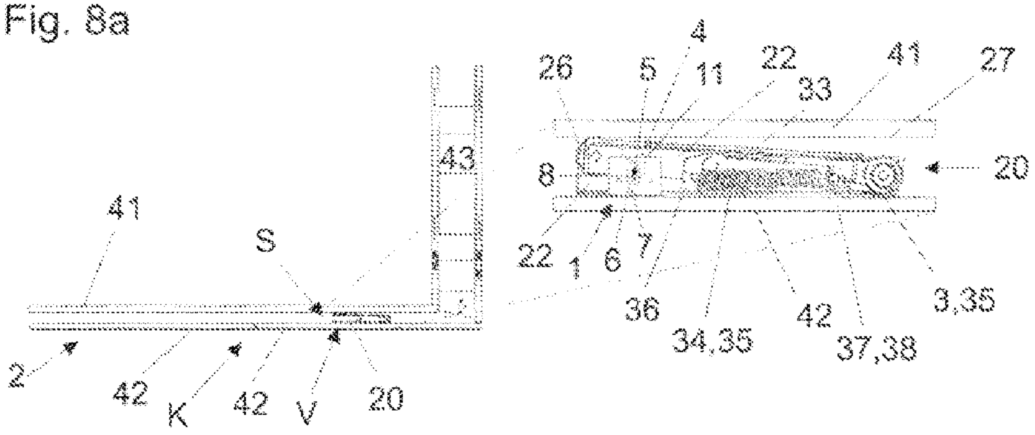
FIGS. 8*a*-8*d* show an ejection device according to a second preferred embodiment between a moving furniture part and the furniture carcass of a piece of furniture with a locking device according to a second preferred embodiment, in different positions between the coplanar position and an open position of the moving furniture part and a lateral receiving shaft in a view from above.

FIG. 8*a* shows an ejection device 20 according to a further embodiment, wherein the ejection device 20 is arranged between the furniture carcass 41 and the movable furniture part 2—consisting of two panels 42. A detailed section of the ejection device 20 with internal contours is indicated on the right.

The ejection device 20 is in the closed position S, wherein the locking device 1 arranged on the ejection device 20 is in the locking position V. The two panels 42 are therefore in the coplanar position K.

Figure 8B:
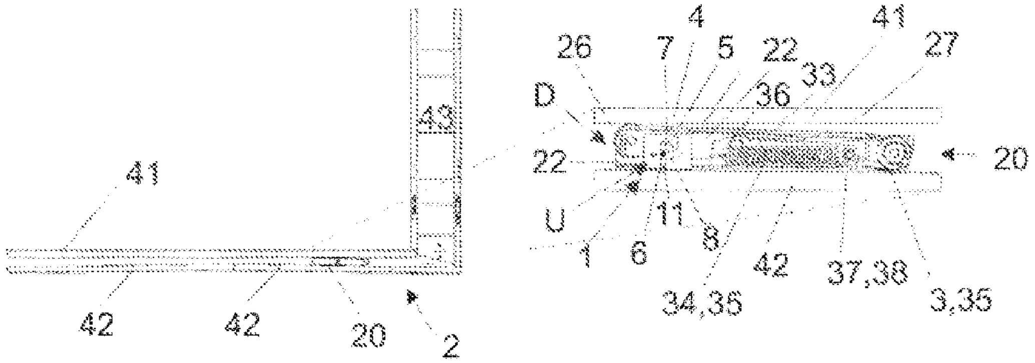

FIG. 8*b* shows the ejection device 20 in the pushed-through position D, wherein the locking device 1 is in the overpressed position U.

Figure 8C:
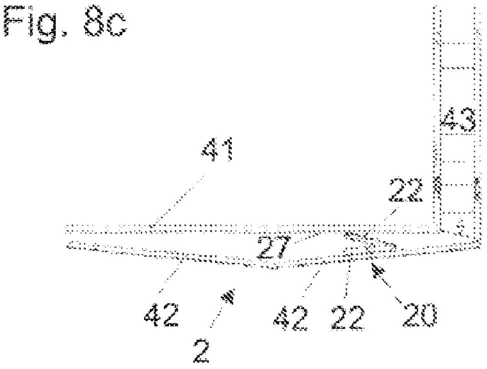

FIG. 8*c* shows a position of the two panels 42 between the coplanar position K and the open position, wherein the rolling bodies 26 are supported on the furniture carcass and one of the two levers 22 is connected to the movable furniture part 2 via fastening means 24.

Figure 8D:
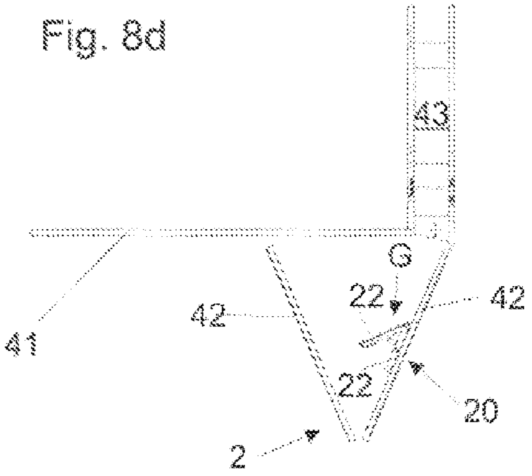

FIG. 8*d* shows the open position of the movable furniture part 2, wherein the ejection device 20 arranged on the movable furniture part 2 is in the open pivoting position G.

Figure 9A:
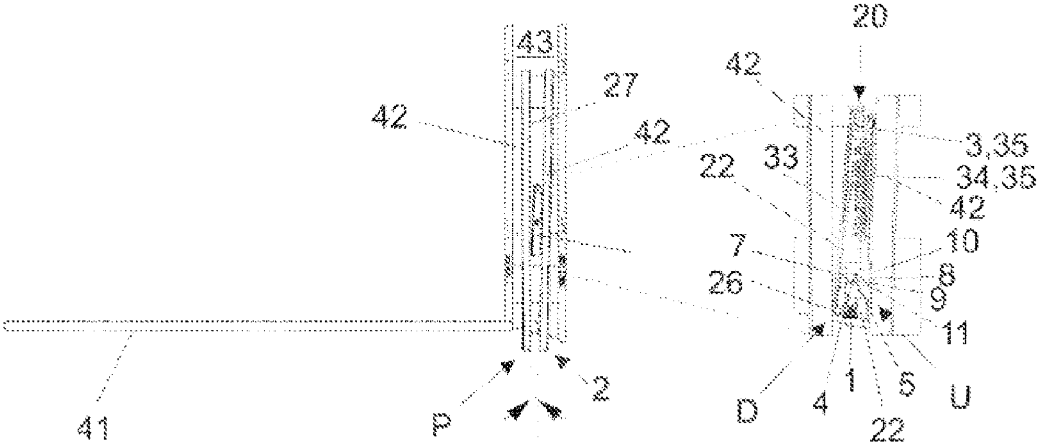
FIGS. 9*a*-9*c* show the ejection device according to the embodiment shown in FIG. 8*a* between two panels of the moving furniture part of the piece of furniture according to the embodiment shown in FIG. 8*a* in different positions between the parallel position and a spread-open position of the moving furniture part in a view from above.

FIG. 9*a* shows the movable furniture part 2 in the lateral receiving shaft 43, wherein the two panels are in the parallel position P, the ejection device 20 is in the pushed-through position D and the locking device 1 is in the overpressed position U.

Figure 9B:
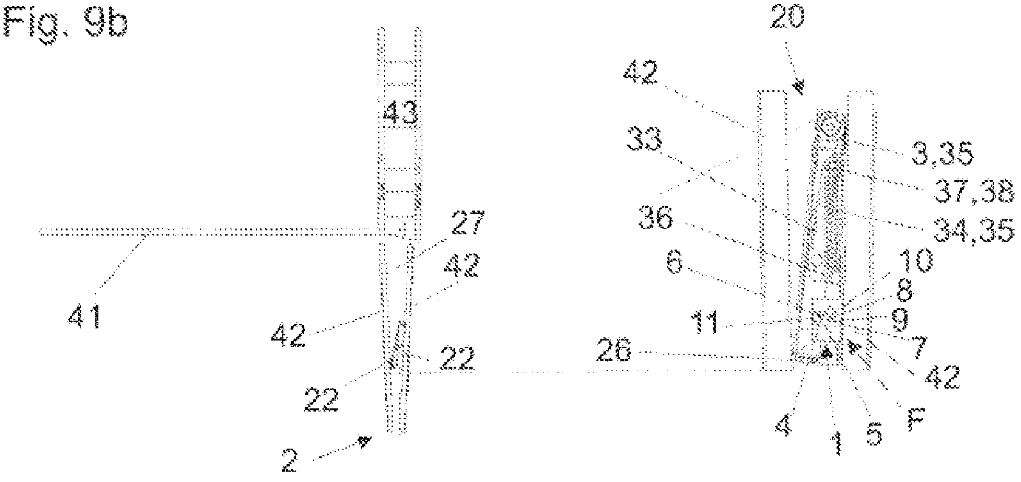

FIG. 9*b* shows the position of the movable furniture part 2 in which the two panels 42 have been pulled out of the receiving shaft 43 and the ejection device 20 spreads open the two panels 42 in the direction of the spread-open position, as the locking device 1 in the receiving shaft 43 is not in the locking position V.

Figure 9C:
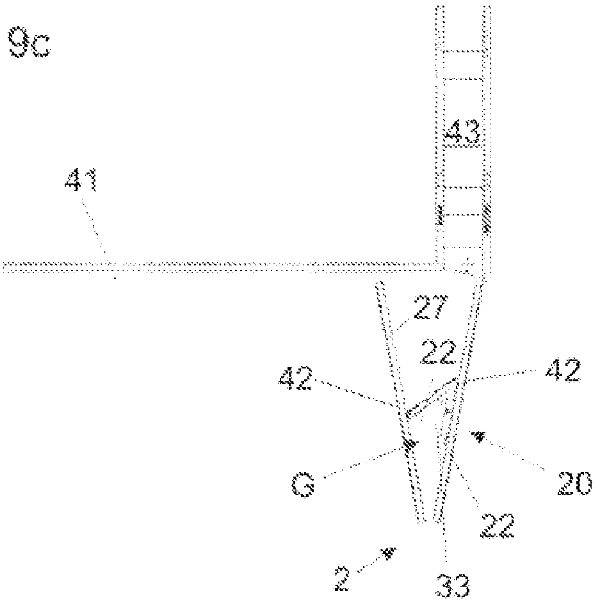

FIG. 9*c* shows the position of the movable furniture part 2 in which the ejection device 20 is in the open pivoting position G and is only just in contact with both panels 42.

Figure 10A:
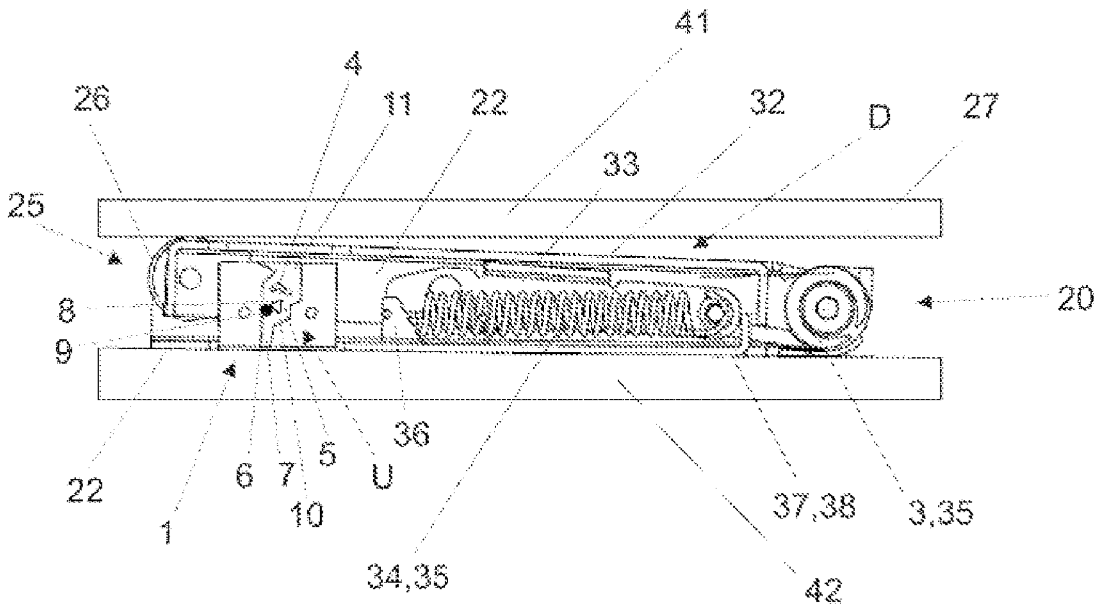
FIGS. 10*a*-10*b* show the ejection device according to the embodiment shown in FIG. 8*a* in an enlarged representation from the side in a pushed-through position and an open pivoting position.

FIG. 10*a* shows the ejection device 20 in an enlarged representation, wherein the locking device 1 and the internal components can be seen in the representation.

Figure 10B:
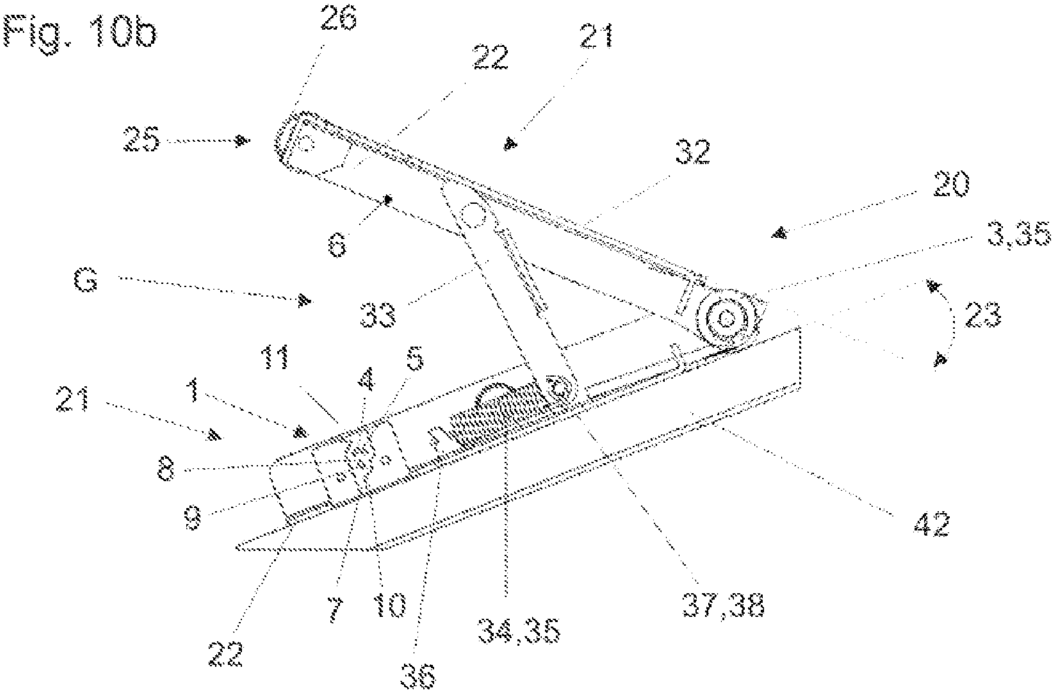

FIG. 10*b* shows the ejection device 20, wherein a spreading element 33 is arranged between the two levers 22 and a further energy storage mechanism 34 is provided. Force is applied to the two levers 22 by the further energy storage mechanism 34 via the spreading element 33.

The energy storage mechanism 3 and the further energy storage mechanism 34 are formed in the form of springs 35, wherein the energy storage mechanism 3 is present as a leg spring and the further energy storage mechanism 34 is present as a coil spring.

The further energy storage mechanism 34 is arranged between an energy storage mechanism bracket 36 arranged stationary and an energy storage mechanism bracket 37 that can move relative thereto. The further energy storage mechanism 34 is arranged on a cross member 38 connected to the spreading element 33, wherein the cross member 38 simultaneously assumes the function of the movable energy storage mechanism bracket 37. The cross member 38 comprises two rolling elements 39 for movement along a lever 22. The spreading element 33 is connected to the cross member 38 and one of the levers 22 in an articulated manner.

The energy storage mechanism 3 and the further energy storage mechanism 34 can be loaded by a movement of one of the two levers 22.

Figure 11A:
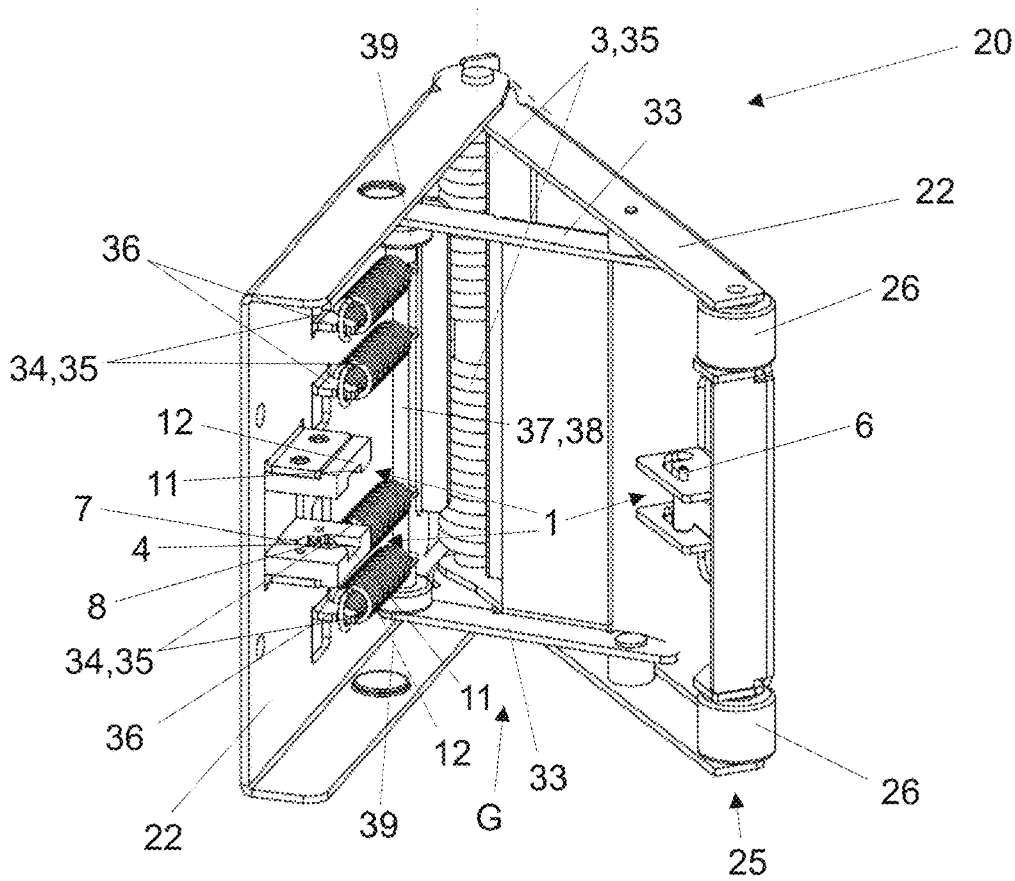
FIGS. 11*a*-11*b* show the ejection device according to the embodiment shown in FIG. 8*a* in an enlarged perspective representation.
Figure 11B:
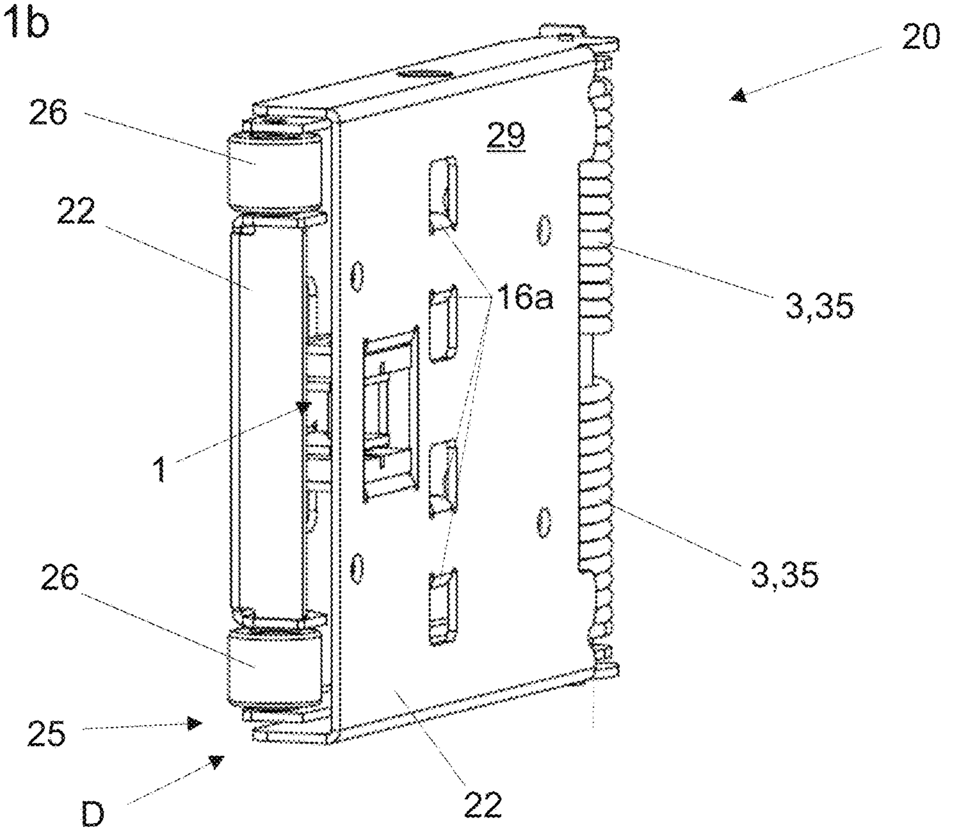

FIG. 11*a* shows the ejection device 20 in the open pivoting position G and FIG. 11*b* shows the ejection device 20 in the pushed-through position D.

Figure 12A:
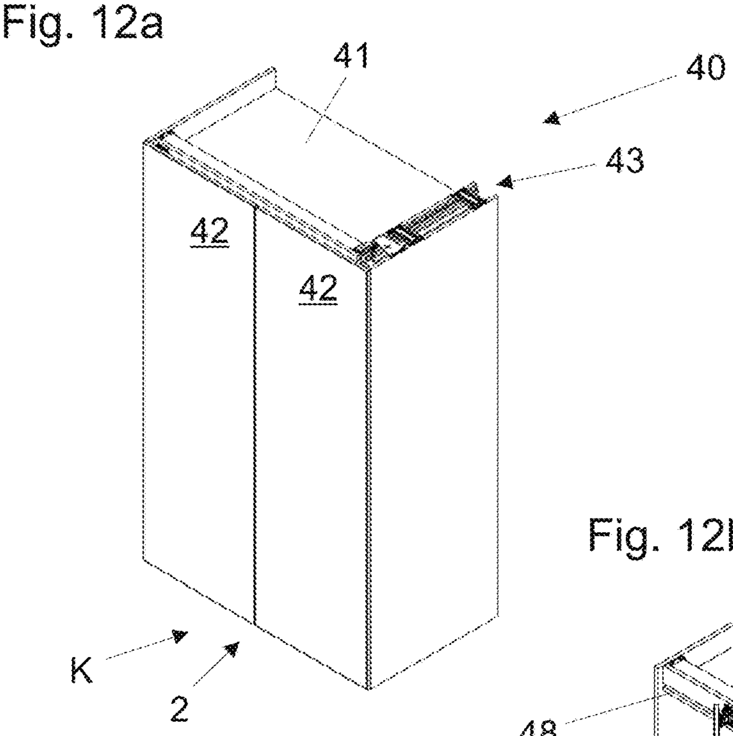
FIGS. 12*a*-12*c* show a piece of furniture according to a further preferred embodiment with a lateral receiving shaft, an ejection device according to the embodiment shown in FIG. 8*a* and various positions of the moving furniture part, guided via a carriage, in a perspective representation.

FIG. 12*a* shows a piece of furniture with the movable furniture part 2 in the coplanar position K.

Figure 12B:
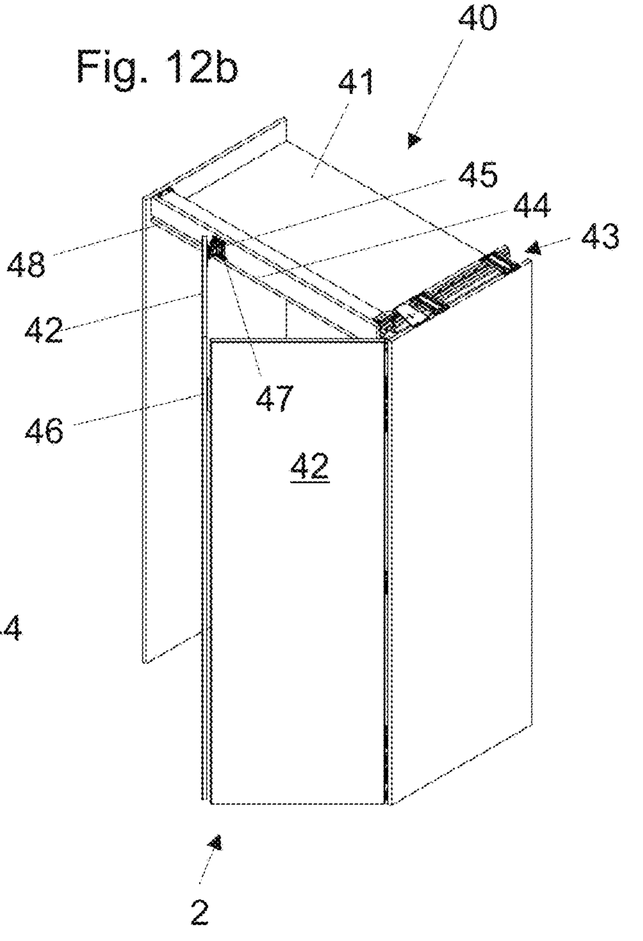

FIG. 12*b* shows the piece of furniture with a carriage 45, wherein the carriage 45 can travel along a horizontally arranged rail 44. The carriage 45 is coupled to one of the two panels 42. A hinge 46 is provided in order to connect the two panels 42 to one another in an articulated manner.

The carriage 45 can be lowered into the receiving shaft 43 together with the movable furniture part 2. In the case of a movement along the rail 44, the carriage 45 is supported on a guide 48 via a guide roller 47. The movement of the spreading element 33 can be blocked by means of the carriage 45.

Figure 12C:
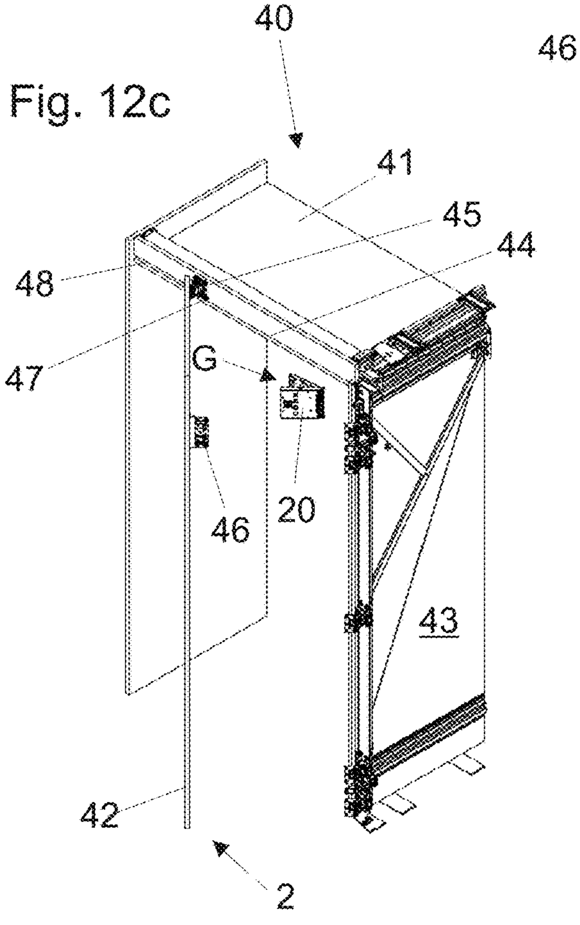

FIG. 12*c* differs from FIG. 12*b* in that a side wall of the receiving shaft 43 and one of the two panels 42 have been removed for the sake of clarity, in order to reveal the ejection device 20 and the structural design.

Figure 13:
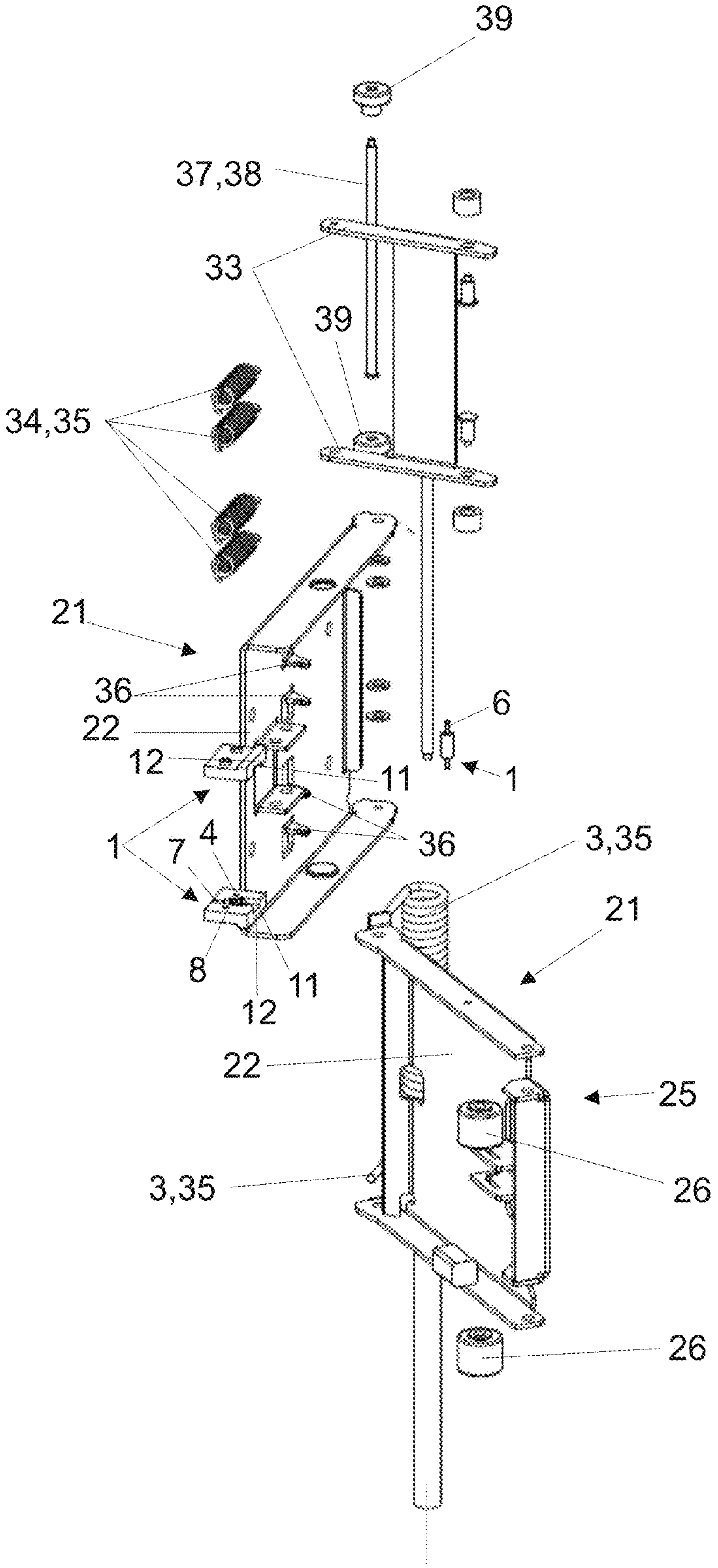
FIG. 13 is an exploded representation of the ejection device, showing its individual components, according to the embodiment shown in FIG. 8*a*, FIGS. 14*a*-14*b* show the ejection device according to the embodiment shown in FIG. 8*a* in a closed position with a representation of the component part contours and a detailed view of a locking mechanism according to a further preferred embodiment in the locking state and the release position.

FIG. 13 shows the ejection device 20 according to the embodiment shown in FIG. 8*a*, disassembled into its individual components. In this embodiment, the locking element 6 is formed bolt shaped.

The locking device 1 according to this embodiment is formed mirror-symmetrical, wherein there are two heart-shaped locking contours 4, two blocking contours 8, two inlet openings 11, two push-through depressions 7 and two bypass channels 10.

Figure 14A:
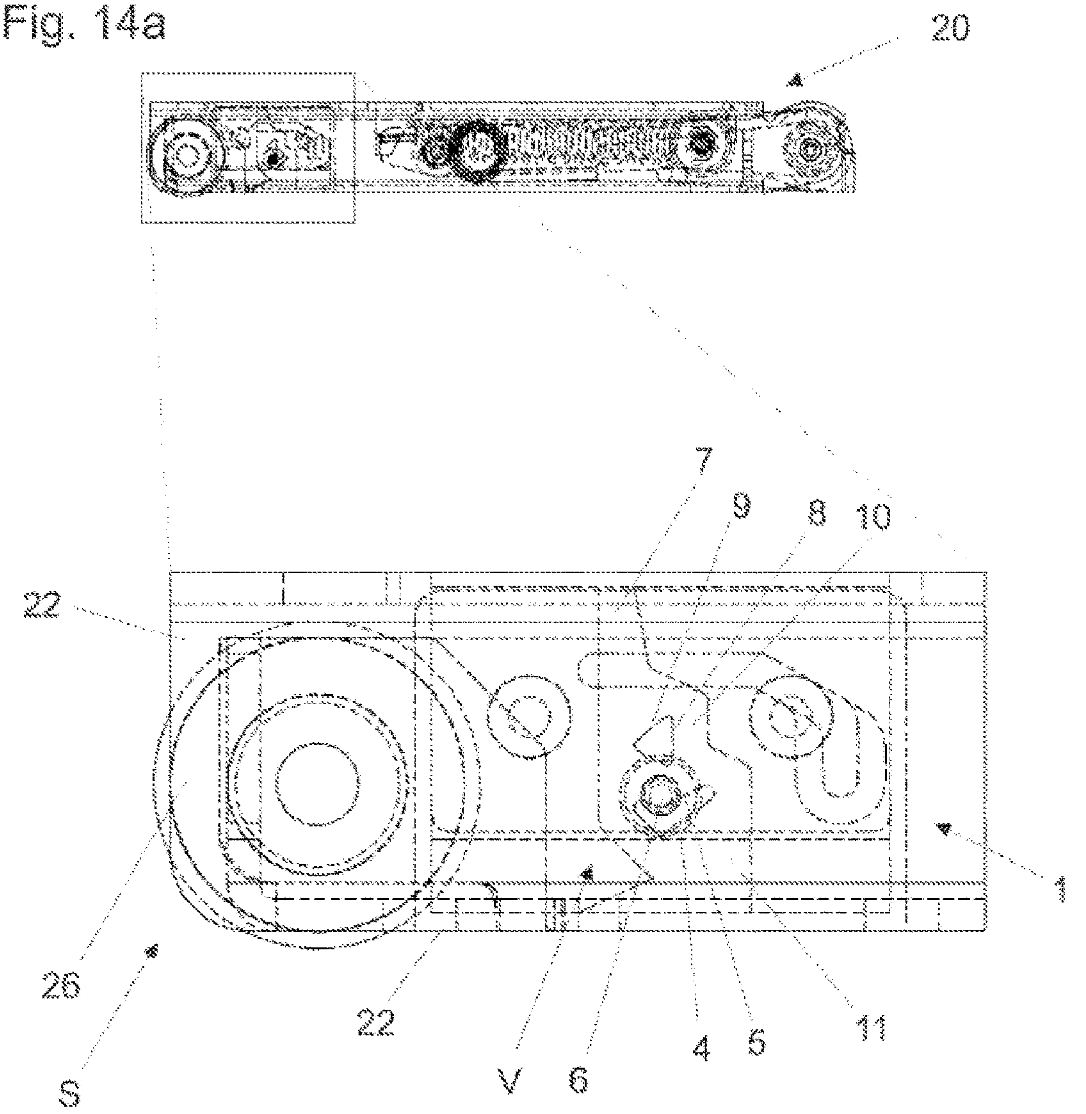

FIG. 14*a* shows the ejection device 20 in the closed position S with internal component part contours and an enlarged detailed section of the locking device 1. The locking device 1 is in the locking position V.

Figure 14B:
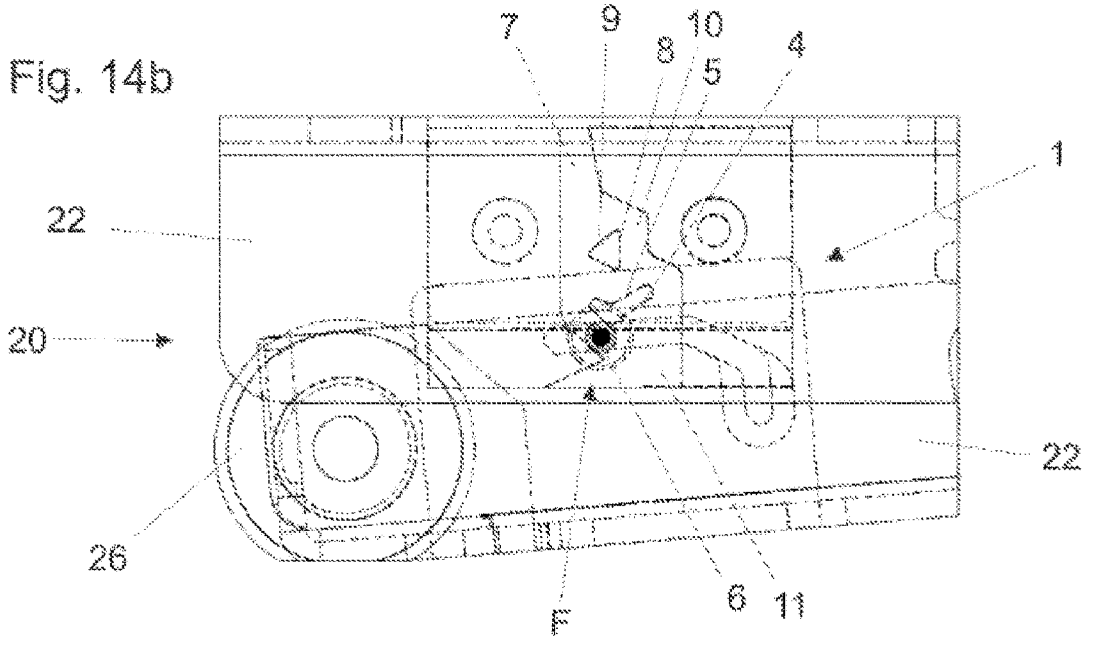

FIG. 14*b* shows the ejection device 20 with the locking device 1 in the release position F.

Figure 15:
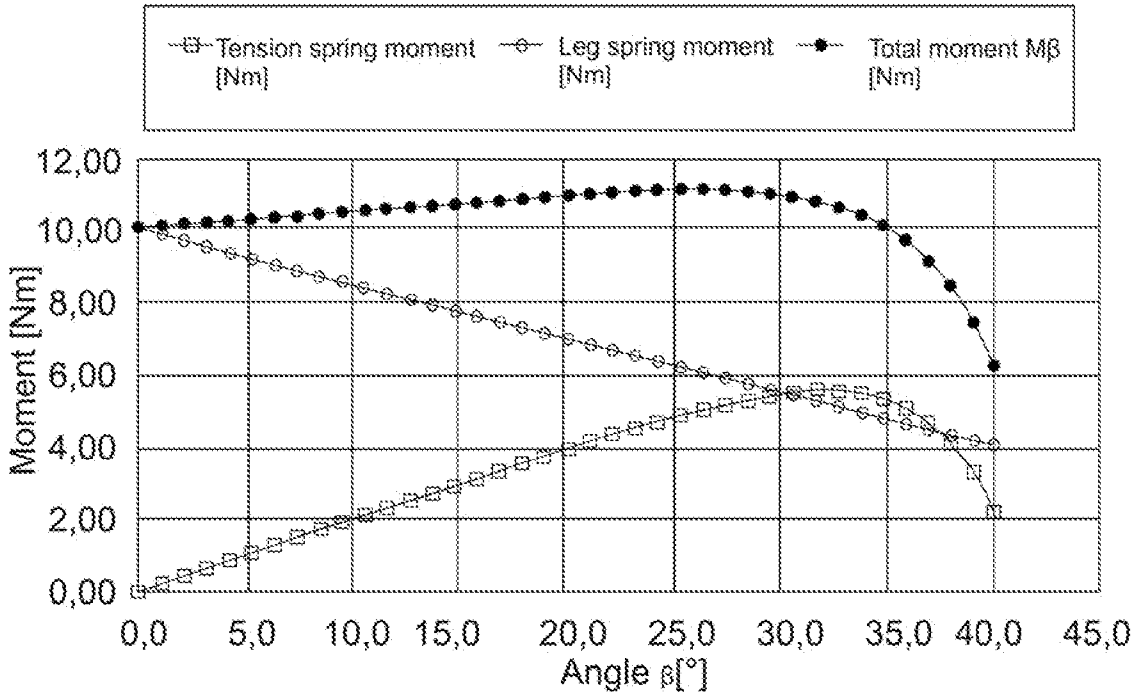
FIG. 15 is a moment diagram for an ejection device according to a further preferred embodiment with two energy storage mechanisms and two further energy storage mechanisms.

FIG. 15 shows a moment diagram for an ejection device 20 with two further energy storage mechanisms 34 in the form of two springs 35 (coil springs), which are coupled to the two spreading elements 33 (see FIG. 11*a*, for example), and two energy storage mechanisms 3 in the form of two springs 35 (leg springs), which are arranged on a joint axle.

As the ejection device 20 has a symmetrical structure, forces acting on one spreading element 33, produced by one coil spring and one leg spring, are represented in graph form in the moment diagram. Consideration is not limited to a further energy storage mechanism 34 in the form of a coil spring and energy storage mechanism 3 in the form of a leg spring.

The x-axis indicates an angle ß in degrees between the two levers 22, which is produced by a movement of the spreading element 33. The y-axis indicates an acting moment in Nm, which acts on the lever 22 via the spreading element 7.

A characteristic curve with rectangular data points describes the acting moment which is produced by the coil spring and a characteristic curve with light, circular data points describes the acting moment which is produced by the leg spring. A characteristic curve with dark, circular data points describes the sum of the two characteristic curves lying underneath and indicates the moment on the lever 22 varying over the angle ß.

No moment produced by the coil spring acts on the lever 22 in the coplanar position K and substantially in the parallel position P. Between the coplanar position K and the open position as well as between the parallel position P and the spread-open position, an increasingly small acting moment of the leg spring partially compensates for an increasingly large acting moment of the coil spring, as a result of which a harmonic moment progression is generated on the lever 22.

Furthermore, substantially no moment of the spring 35 acts on the spreading element 33 and the lever 22 in the closed position S of the ejection device 20 due to the small angle ß between the coil spring and the lever 22. This guarantees a smooth opening of the movable furniture part 2 out of the coplanar position K by the ejection device 20 and a smooth spreading open out of the parallel position P, since force is not applied jerkily to the lever 22 by the spring 35.

LIST OF REFERENCE NUMBERS

Locking device (1)
Furniture part (2)
Energy storage mechanism (3)
Locking contour (4)
Heart-shaped depression (5)
Locking element (6)
Push-through depression (7)
Blocking contour (8)
Blocking chamfer (9)
Bypass channel (10)
Inlet opening (11)
Base (12)
Ejection device (20)
Component part (21)
Lever (22)
Angle (23)
Fastener (24)
End (25)
Rolling body (26)

Stop surface (27)
Spacer (28)
First part (29*a*)
Second part (29*b*)
Guard locking device (30)
Permanent magnet (31)
Exterior (32)
Spreading element (33)
Further (second) energy storage mechanism (34)
Spring (35)
Stationary energy storage mechanism bracket (36)
Movable energy storage mechanism bracket (37)
Cross member (38)
Rolling element (39)
Piece of furniture (40)
Furniture carcass (41)
Panels (42)
Receiving shaft (43)
Rail (44)
Carriage (45)
Hinge (46)
Guide roller (47)
Guide (48)
Ejection mechanism (49)
Limiting element (50)
Locking position (V)
Overpressed position (U)
Release position (F)
Open pivoting position (G)
Closed position (S)
Pushed-through position (D)
Coplanar position (K)
Parallel position (P)

The invention claimed is:

1. A locking device for releasably locking two furniture parts movable relative to one another against a force of an energy storage mechanism, the locking device comprising:

a heart-shaped locking contour with a heart-shaped depression;

a locking element moveable relative to the heart-shaped locking contour and configured to be arranged in the heart-shaped depression of the heart-shaped locking contour in a locking position, the locking element being movable out of the heart-shaped depression into a release position by a movement out of the locking position into an overpressed position;

a push-through depression spaced apart from the heart-shaped depression and configured to receive the locking element; and a blocking contour configured to block a movement of the locking element out of the push-through depression and into the heart-shaped depression, the blocking contour being spaced apart and a separate structure from the heart-shaped locking contour.

2. The locking device according to claim 1, wherein the blocking contour has a blocking chamfer configured to forced the locking element toward the release position, starting from a position in the push-through depression.

3. The locking device according to claim 1, further comprising a bypass channel configured to allow the locking element to move past the heart-shaped depression into the push-through depression.

4. The locking device according to claim 1, wherein the locking device has an inlet opening for the locking element, and the heart-shaped locking contour and the blocking contour are arranged between the inlet opening and the push-through depression.

5. The locking device according to claim 1, wherein at least the heart-shaped locking contour, the push-through depression, and the blocking contour are arranged on a common base.

6. The locking device according to claim 1, wherein the locking element is arranged on a pivotable lever.

7. The locking device according to claim 6, wherein the pivotable lever is a first lever of at least two levers pivotable relative to each other.

8. An ejection device for a movable furniture part, comprising:

at least two component parts movable relative to one another;

an energy storage mechanism active between the at least two component parts, and the locking device according to claim 1, wherein the heart-shaped locking contour is arranged on a first one of the at least two component parts and the locking element is arranged on a second one of the at least two component parts.

9. A piece of furniture comprising:

a furniture carcass;

a furniture part movable relative to the furniture carcass; and the ejection device according to claim 8.

10. The piece of furniture according to claim 9, wherein the movable furniture part has at least two panels connected to one another in an articulated manner, the at least two panels being movable between a coplanar position, in which the at least two panels are arranged substantially coplanar, and a parallel position, in which the at least two panels are arranged substantially parallel, wherein the ejection device is arranged on a first one of the at least two panels, and wherein the at least two levers are configured to be arranged in the locked closed position when the at least two panels are located in the coplanar position, and are arranged in the unlocked pushed-through position when the at least two panels are located in the parallel position.

11. The piece of furniture according to claim 9, further comprising a receiving shaft arranged laterally on the furniture carcass and configured to receive the movable furniture part arranged in the parallel position of the at least two panels.

12. The piece of furniture according to claim 11, further comprising a carriage to be coupled to one of the at least two panels.

13. The piece of furniture according to claim 12, wherein the carriage is configured to travel along a horizontally arranged rail, and is coupled to one of the at least two panels by a hinge, the carriage being further configured to:

be lowered into the receiving shaft with the movable furniture part, and/or be supported on a guide via at least one guide roller during a movement along the rail, and/or block a movement of the spreading element.

14. The piece of furniture according to claim 11, further comprising an ejection mechanism configured to eject the at least two panels from the receiving shaft.

15. The piece of furniture according to claim 9, wherein the ejection device is configured to be transferred out of the locked closed position into the open pivoting position through the exertion of pressure on the at least two panels.

16. The piece of furniture according to claim 15, wherein the ejection device is configured to exert the pressure in a region in which the at least two panels are connected to one another in an articulated manner.

17. An ejection device for a movable furniture part, comprising:

at least two levers pivotable relative to one another;

an energy storage mechanism configured to apply a force to the at least two levers in a direction of an open pivoting position in a loaded state; and the locking device according to claim 1 for releasably locking the at least two levers in a closed position against the force of the loaded energy storage mechanism, wherein the locking device is configured to allow the at least two levers to move unlocked and freely relative to one another in a pushed-through position, in which the at least two levers form an angle smaller than an angle of the at least two levers in the closed position.

18. The ejection device according to claim 17, wherein the heart-shaped locking contour of the locking device is arranged on a first one of the at least two levers and the locking element is arranged on a second one of the at least two levers.

19. The ejection device according to claim 17, wherein:

a first one of the at least two levers has a fastener for fastening the ejection device on to the movable furniture part, and/or a second one of the at least two levers has a free end, the free end having a rotatably mounted rolling body for supporting the second one of the at least two levers against a stop surface, and/or a second one of the at least two levers has a free end, the free end having a spacer arrangeable in different positions relative to the free end.

20. The ejection device according to claim 17, further comprising a first part of a guard locking device configured to be brought into operative connection with a second part of the guard locking device to be arranged on a piece of furniture.

21. The ejection device according to claim 20, wherein a first one of the first part and the second part of the guard locking device has a permanent magnet, and a second one of the first part and the second part of the guard locking device is at least partially metallic, and/or the first part of the guard locking device is arranged on an exterior of the ejection device.

22. The ejection device according to claim 17, wherein the energy storage mechanism is a first energy storage mechanism, the ejection device further comprising:

a spreading element arranged between the at least two levers, and a second energy storage mechanism configured to apply force to the at least two levers via the spreading element.

23. The ejection device according to claim 22, wherein the first energy storage mechanism and/or the second energy storage mechanism is a spring.

24. The ejection device according to claim 22, wherein the second energy storage mechanism is arranged between a stationary energy storage mechanism bracket and a movable energy storage mechanism bracket movable relative to the stationary energy storage mechanism bracket, and/or the second energy storage mechanism is arranged on a cross member connected to the spreading element.

25. The ejection device according to claim 24, wherein the spreading element is connected to the cross member and/or one of the at least two levers in an articulated manner.

26. The ejection device according to claim 24, wherein the second energy storage mechanism is arranged on a cross member connected to the spreading element, and the cross member comprises a rolling element for movement along one of the at least two levers.

27. The ejection device according to claim 22, wherein the first energy storage mechanism and/or the second energy storage mechanism is configured to be loaded by a movement of at least one of the at least two levers.

28. The locking device according to claim 1, wherein the locking element is bolt-shaped.

29. A locking device for releasably locking two furniture parts movable relative to one another against a force of an energy storage mechanism, the locking device comprising:

a heart-shaped locking contour having a heart-shaped depression;

a locking element movable relative to the heart-shaped locking contour and configured to be arranged in the heart-shaped depression of the heart-shaped locking contour in a locking position, the locking element being movable out of the heart-shaped depression into a release position by a movement out of the locking position into an overpressed position;

a push-through depression spaced apart from the heart-shaped depression and configured to receive the locking element; and a blocking contour configured to block a movement of the locking element out of the push-through depression and into the heart-shaped depression, wherein the heart-shaped locking contour, the locking element, the push-through depression, and the blocking contour are configured:

to allow the locking device to be moved from the release position into the locking position, from the locking position into the release position, and from the release position again into the release position without subsequent locking depending on an amount of pressure exerted on at least one of the two furniture parts, and during a transition to a less overpressed position of the locking device, guide the locking element past the heart-shaped depression and move the locking element into the release position via the blocking contour.

* * * * *